(12) United States Patent  (10) Patent No.: US 7,460,880 B2
Miyoshi et al.  (45) Date of Patent: Dec. 2, 2008

(54) COMMUNICATION TERMINAL APPARATUS AND BASE STATION APPARATUS

(75) Inventors: Kenichi Miyoshi, Yokohama (JP); Takahisa Aoyama, Yokosuka (JP); Toyoki Ue, Yokosuka (JP); Osamu Kato, Yokosuka (JP); Katsuhiko Hiramatsu, Yokosuka (JP); Atsushi Sumasu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/341,430

(22) Filed: Jan. 30, 2006

(65) Prior Publication Data

US 2006/0121930 A1 Jun. 8, 2006

Related U.S. Application Data

(60) Division of application No. 10/322,425, filed on Dec. 19, 2002, now abandoned, which is a continuation of application No. 10/069,267, filed on Feb. 25, 2002, now Pat. No. 6,738,646.

(51) Int. Cl.
*H04B 7/00* (2006.01)

(52) U.S. Cl. .................. 455/522; 455/561; 370/318

(58) Field of Classification Search .......... 455/522, 455/9, 13.4, 133–135, 115.1, 226.1–2, 17, 455/561; 370/318, 317; 375/260, 267
See application file for complete search history.

(56) References Cited

U.S. PATENT DOCUMENTS 5,519,884 A 5/1996 Duque-Anton et al.
5,703,902 A 12/1997 Ziv et al.
5,710,981 A * 1/1998 Kim et al. ................. 455/69
5,822,318 A 10/1998 Tiedemann et al.

(Continued)

FOREIGN PATENT DOCUMENTS

EP 0790713 8/1997

(Continued)

OTHER PUBLICATIONS

Supplementary Partial European Search Report dated Nov. 21, 2002.

(Continued)

*Primary Examiner*—CongVan Tran
(74) *Attorney, Agent, or Firm*—Dickinson Wright, PLLC

(57) ABSTRACT

An allocation section 101 in a base station apparatus of the present invention sets the transmission rate of a transmit signal for a communication terminal apparatus based on a DRC signal transmitted from that communication terminal apparatus. A power margin information detector 117 detects power margin information from a demodulated signal generated by a demodulator 115, and, using that power margin information, a power setting section 118 makes a setting so as to give the minimum transmission power value at which received signal characteristics in each communication terminal apparatus meet the desired quality. Using the set transmission power value, the base station apparatus transmits a transmit signal of the set transmission rate to a communication terminal apparatus. By this means it is possible to suppress interference to a communication terminal apparatus that performs adaptive modulation communication with another base station apparatus and a communication terminal apparatus that performs adaptive modulation communication with the local base station apparatus at the same time.

8 Claims, 21 Drawing Sheets

U.S. PATENT DOCUMENTS

| | | | |
|---|---|---|---|
| 5,873,028 A | 2/1999 | Nakano et al. | |
| 5,926,763 A | 7/1999 | Greene, Sr. et al. | |
| 6,009,119 A | 12/1999 | Jovanovich et al. | |
| 6,137,840 A | 10/2000 | Tiedemann et al. | |
| 6,385,462 B1 | 5/2002 | Baum et al. | |
| 6,466,802 B1 | 10/2002 | Blakeney, II et al. | |
| 6,574,211 B2 * | 6/2003 | Padovani et al. | 370/347 |
| 6,636,723 B1 | 10/2003 | Kitagawa et al. | |
| 6,950,632 B1 * | 9/2005 | Yun et al. | 455/69 |
| 7,075,909 B1 * | 7/2006 | Iinuma | 370/329 |
| 2002/0009061 A1 | 1/2002 | Willenegger | |
| 2002/0010001 A1 | 1/2002 | Dahlman et al. | |
| 2002/0193146 A1 | 12/2002 | Wallace et al. | |
| 2006/0121930 A1 * | 6/2006 | Miyoshi et al. | 455/522 |

FOREIGN PATENT DOCUMENTS

| | | |
|---|---|---|
| EP | 0942541 A2 | 9/1999 |
| EP | 0986282 | 3/2000 |
| JP | 07250116 | 9/1995 |
| JP | 2000165290 | 3/1997 |
| JP | 09135275 | 5/1997 |
| JP | 11298407 | 10/1999 |
| JP | 11514172 | 11/1999 |
| JP | 11355373 | 12/1999 |
| JP | 2000049663 | 2/2000 |
| JP | 2000078077 | 3/2000 |
| WO | 9631014 | 10/1996 |
| WO | 9824199 | 6/1998 |
| WO | 9912304 | 3/1999 |
| WO | 9914869 | 3/1999 |

OTHER PUBLICATIONS

Japanese Office Action dated Jan. 7, 2003 with English translation.
Supplementary Partial European Search Report dated Apr. 9, 2003.
Japanese Office Action dated Aug. 31, 2004 with English translation.
European Search Report dated Feb. 22, 2005.

* cited by examiner

COMMUNICATION TERMINAL APPARATUS AND BASE STATION APPARATUS

This is a divisional of application Ser. No. 10/322,425 filed Dec. 19, 2002, which is a continuation of application Ser. No. 10/069,267 filed Feb. 25, 2002.

TECHNICAL FIELD

The present invention relates to a base station apparatus and communication method to be used in a cellular communication system.

BACKGROUND ART

In a cellular communication system, one base station performs radio communication with a plurality of communication terminals simultaneously. In such a cellular communication system, there is a demand for transmission efficiency to be increased.

As a method of increasing the transmission efficiency over the downlink from a base station to a communication terminal, a method is proposed of performing scheduling that for allocating communication resources to communication terminals by means of time division, and of further setting a transmission rate for each communication terminal according to communication quality to transmit data. Hereinafter, this method is referred to as "adaptive modulation communication".

Adaptive modulation communication will be described below using FIG. 1. In FIG. 1, it is assumed that a base station 11 is currently performing communication with communication terminals 12 through 14, which are within the cell area 15 covered by this base station 11. Communication terminals 20 through 22 are within the range of the cell area 15, but perform communication with a base station (not shown) other than this base station 11.

First, the base station 11 transmits a pilot signal to communication terminals 12 through 14. Each of communication terminals 12 through 14 estimates communication quality according to a CIR (Carrier to Interference Ratio) etc., using the pilot signal transmitted from the base station 11, and calculates a transmission rate at which communication is possible. Also, based on the transmission rate at which communication is possible, each of communication terminals 12 through 14 selects a communication mode indicating a combination of packet length, error correction, and modulation method, and transmits a signal indicating the communication mode to the base station 11.

Based on the communication mode selected by each of communication terminals 12 through 14, the base station 11 performs scheduling, sets a transmission rate for each communication terminal, and notifies a signal indicating communication resource allocation to each of communication terminals 12 through 14 via a control channel.

The base station 11 transmits data only to the relevant communication terminal in its assigned time via a data channel. For example, when time t1 is assigned to communication terminal 12, in time t1 the base station 11 transmits data only to communication terminal 12, and does not transmit to communication terminals 13 and 14. Also, transmission power when the base station 11 transmits data to communication terminals 12 through 14 is always constant.

Parallel to adaptive modulation communication, ordinary CDMA (Code Division Multiple Access) communication is performed in parallel between the base station 11 and communication terminals 12 through 14 in a different band from that for adaptive modulation communication.

However, in above-described conventional adaptive modulation communications, the following problem arises. Referring again to FIG. 1, the base station 11 transmits data to each of communication terminals 12 through 14 always using fixed power, regardless of the distances to communication terminals 12 through 14. This power is high enough to ensure that reception quality is sufficiently good at all communication terminals in the cell area 15.

Consequently, there is a possibility that, among communication terminals performing adaptive modulation communication with a base station other than base station 11 (hereinafter referred to as "another base station"), communication terminals within the cell area 15 covered by base station 11 (in FIG. 1, communication terminals 20 through 22) may receive interference due to a signal transmitted to any one of communication terminals 12 through 14 from base station 11. As a result, the communication quality of a communication terminal receiving interference in this way will deteriorate.

For example, if the time when base station 11 transmits data to communication terminal 12 via a data channel is coincident with the time when another base station transmits data to communication terminal 20 via a data channel, communication terminal 20 receives interference due to the signal transmitted from base station 11 to communication terminal 12.

Also, if base station 11 transmits adaptively modulated signals to a plurality of communication terminals (for example, communication terminals 12 through 14) at the same time, the communication quality of that plurality of communication terminals will deteriorate because delayed waves of the signals transmitted to that plurality of communication terminals will cause mutual interference.

As explained above, in above-described conventional adaptive modulation communications there is a problem in that an adaptively modulated signal transmitted from a base station causes interference with a communication terminal performing adaptive modulation communication with another base station, or with a communication terminal performing communication with the same base station at the same time.

DISCLOSURE OF INVENTION

It is an object of the present invention to provide a base station apparatus and communication method that suppress interference to a communication terminal performing communication with another base station apparatus or a communication terminal apparatus performing communication with the same station at the same time.

This object is achieved by having this base station apparatus set the transmission rate of a communication terminal apparatus based on the reception quality of that communication terminal apparatus, and perform transmission to that communication terminal apparatus using a minimum transmission power value at which the characteristics of a received signal in that communication terminal apparatus meet a desired quality. Also, the above object is achieved by having this base station apparatus set a transmission power value according to whether or not reception quality in a communication terminal apparatus is excessive, and performing transmission to that communication terminal apparatus using that transmission power value.

BEST MODE FOR CARRYING OUT THE INVENTION

With reference now to the accompanying drawings, embodiments of the present invention will be explained in detail below. In the following embodiments, a base station apparatus performs "adaptive modulation communication" whereby data is transmitted after communication resources are allocated to communication terminal apparatuses by means of time division and a transmission rate is set for each communication terminal apparatus. A pilot signal is transmitted from the base station apparatus to a communication terminal apparatus via a control channel, and data (speech, packet, etc.) is transmitted from the base station apparatus to a communication terminal apparatus via a data channel. Signals communicated via the control channel and data channel are designated "control channel signal" and "data channel signal", respectively.

Embodiment 1

Figure 1:
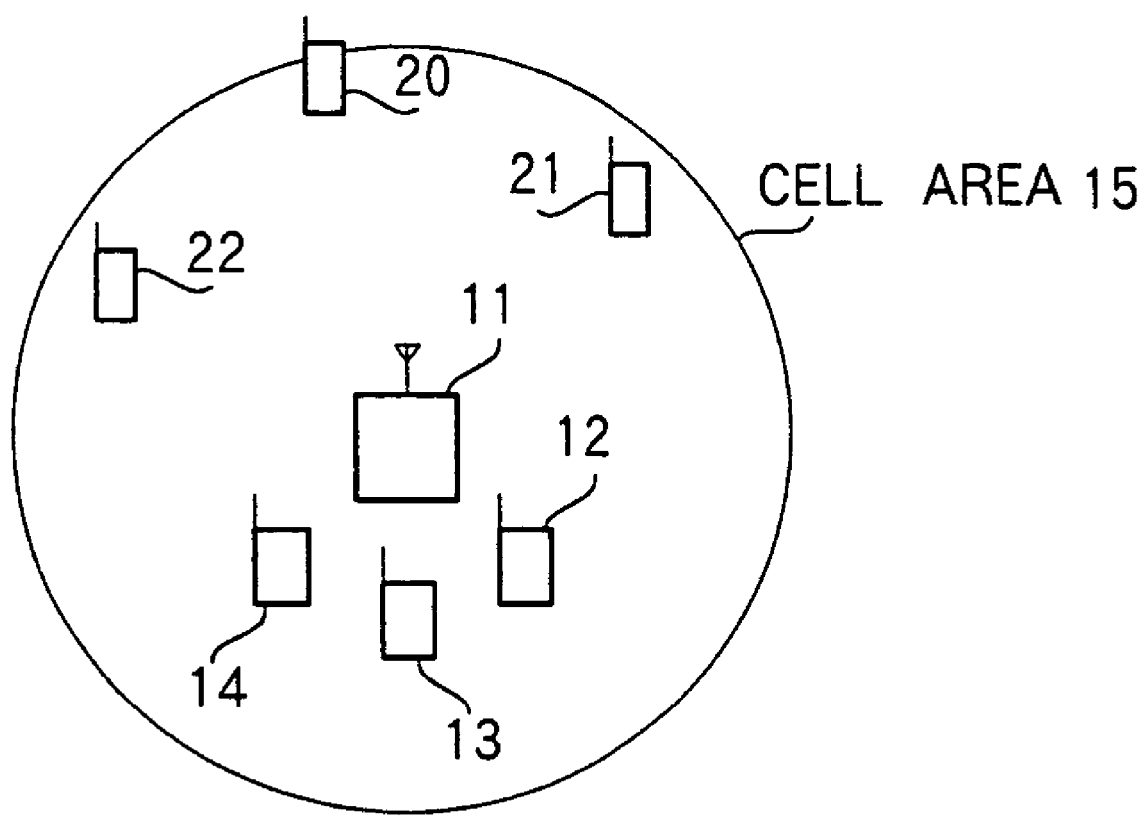
FIG. 1 is a diagram illustrating conventional adaptive modulation communication.
Figure 2:
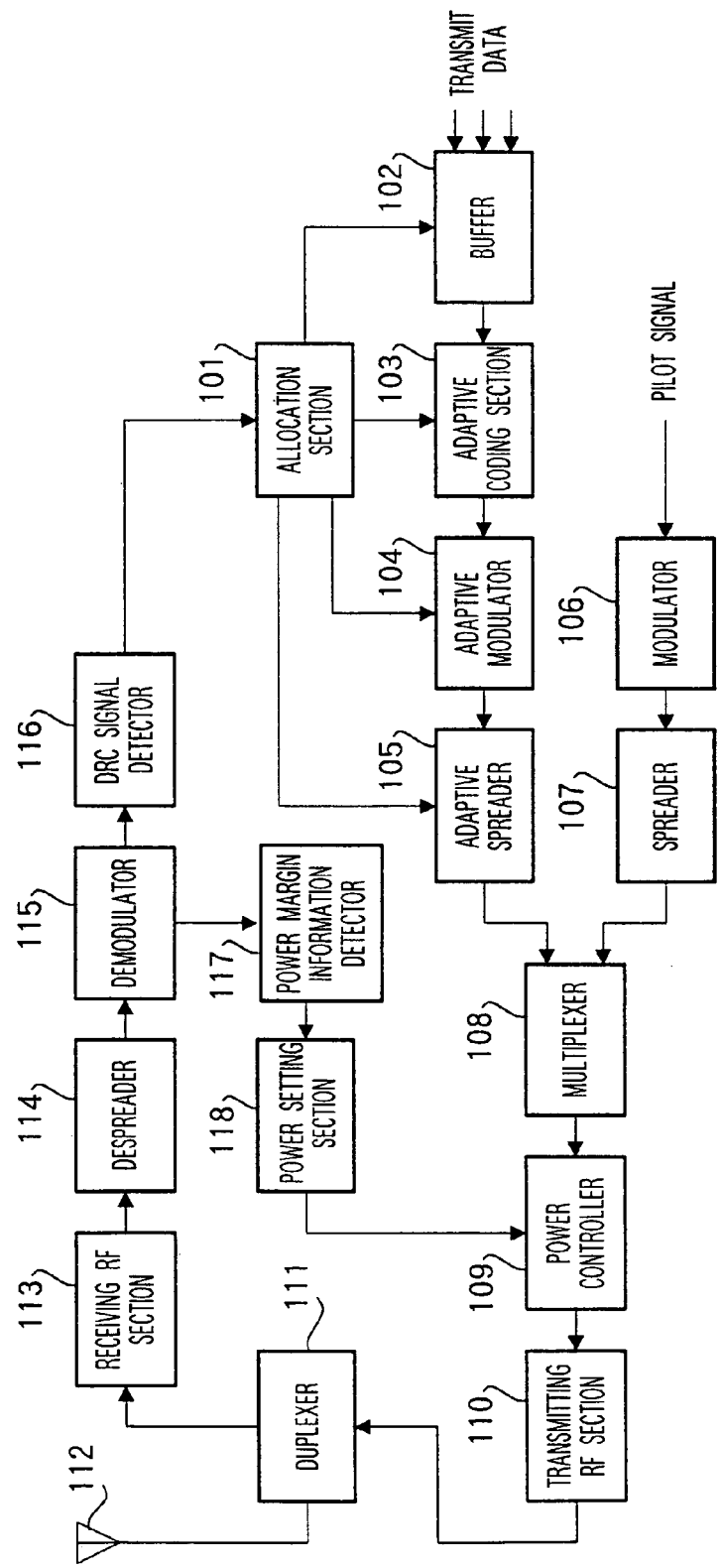
FIG. 2 is a block diagram showing the configuration of a base station apparatus according to Embodiment 1 of the present invention.

FIG. 2 is a block diagram showing the configuration of a base station apparatus according to Embodiment 1 of the present invention In FIG. 2, an allocation section 101 ascertains a transmission rate at which communication is possible for each communication terminal apparatus based on a data rate control (hereinafter referred to as "DRC") signal detected by a DRC signal detector 116 described later herein, determines communication resource allocation to each communication terminal apparatus, and gives an instruction for output of downlink transmit data to a buffer 102. This DRC signal is a signal indicating a transmission rate at which reception is possible by a communication terminal apparatus at the desired quality. A detailed description of this DRC signal will be given later herein.

The allocation section 101 also indicates the downlink transmit data coding method to an adaptive coding section 103, indicates the downlink transmit data modulation method to an adaptive modulator 104, and indicates a spreading code by which downlink transmit data is to be multiplied to an adaptive spreader 105.

The buffer 102 holds downlink transmit data, and outputs downlink transmit data for a predetermined communication terminal apparatus to the adaptive coding section 103 in accordance with an instruction from the allocation section 101. In accordance with an instruction from the allocation section 101, the adaptive coding section 103 performs coding on transmit data from the buffer 102, and outputs the coded transmit data to the adaptive modulator 104.

In accordance with an instruction from the allocation section 101, the adaptive modulator 104 modulates transmit data coded by the adaptive coding section 103, and outputs the modulated transmit data to the adaptive spreader 105. In accordance with an instruction from the allocation section 101, the adaptive spreader 105 spreads transmit data modulated by the adaptive modulator 104, and outputs the spread transmit data to a multiplexer 108.

Meanwhile a modulator 106 modulates a pilot signal and outputs the modulated pilot signal to a spreader 107. The spreader 107 spreads modulated pilot signal by modulator 106 and outputs the resulting signal to the multiplexr 108.

The multiplexer 108 performs time multiplexing of spread downlink transmit data and a spread pilot signal to generate a transmit signal, and outputs the generated transmit signal to a power controller 109. At the start of communication, only a pilot signal is output from the multiplexer 108 to the power controller 109.

The power controller 109 amplifies the transmit signal generated by the multiplexer 108 so as to be at the transmission power value set by a power setting section 118 described later herein, and outputs the amplified transmit signal to a transmitting RF section 110.

The transmitting RF section 110 converts the frequency of the transmit signal amplified by the power controller 109 to a radio frequency, and outputs this signal to a duplexer 111. The duplexer 111 transmits the transmit signal converted to a radio frequency by the transmitting RF section 110 to a communication terminal apparatus via an antenna 112. The duplexer 111 also outputs a signal transmitted by a communication terminal apparatus and received via the antenna 112 (received signal) to a receiving RF section 113.

The receiving RF section 113 converts the frequency of a received signal from the duplexer 111 to baseband, and outputs the received signal converted to baseband to a despreader 114. The despreader 114 despreads the received signal converted to a baseband signal and outputs the resulting signal to a demodulator 115. The demodulator 115 demodulates the received signal despread by the despreader 114 to generate a demodulated signal, and outputs the generated demodulated signal to the DRC signal detector 116 and a power margin information detector 117.

The DRC signal detector 116 detects a DRC signal from the demodulated signal generated by the demodulator 115, and outputs the detected DRC signal to the allocation section 101. The power margin information detector 117 detects power margin information from the demodulated signal generated by the demodulator 115, and outputs the detected power margin information to a power setting section 118.

Using power margin information from the power margin information detector 117, the power setting section 118 sets a transmit signal transmission power value for each communication terminal apparatus, and outputs the set transmission power values to the power controller 109.

Figure 3:
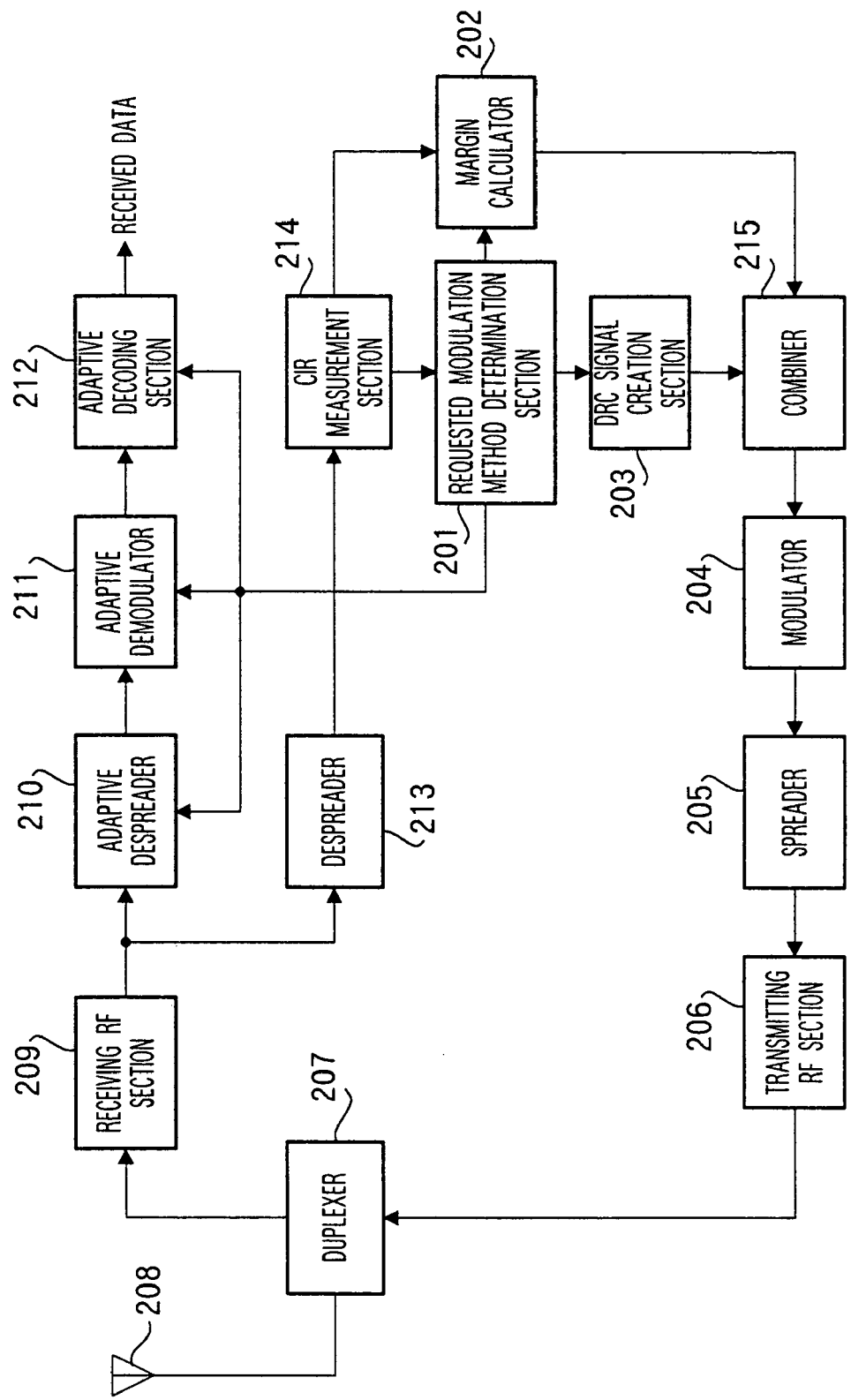
FIG. 3 is a block diagram showing the configuration of a communication terminal apparatus according to Embodiment 1 of the present invention.

FIG. 3 is a block diagram showing the configuration of a communication terminal apparatus according to Embodiment 1 of the present invention.

In FIG. 3, a requested modulation method determination section 201 determines a transmission rate at which a communication terminal apparatus can receive at the desired quality, based on a CIR measured by a CIR measurement section 214 described later herein, and outputs the determined transmission rate to a margin calculator 202 and DRC signal creation section 203.

Based on the determined transmission rate, the requested modulation method determination section 201 also indicates a spreading code by which a received signal is to be multiplied to an adaptive despreader 210, indicates the received signal modulation method to an adaptive demodulator 211, and indicates the received signal decoding method to an adaptive decoding section 212.

Using the CIR measured by the CIR measurement section 214 described later herein and the transmission rate determined by the requested modulation method determination section 201, the margin calculator 202 calculates a power margin and outputs information relating to the calculated power margin—that is, power margin information—to a combiner 215.

The DRC signal creation section 203 creates a DRC signal indicating the transmission rate calculated by the requested modulation method determination section 201, and outputs this DRC signal to the combiner 215.

The combiner 215 generates a combined signal by combining the DRC signal from the DRC signal creation section 203 and power margin information from the margin calculator 202, and outputs the generated combined signal to a modulator 204.

The modulator 204 modulates the combined signal from the combiner 215 and outputs the resulting signal to a spreader 205. The spreader 205 spreads the combined signal modulated by the modulator 204, and outputs the resulting signal to a transmitting RF section 206. The transmitting RF section 206 converts the frequency of the combined signal spread by the spreader 205 to a radio frequency, and outputs this signal to a duplexer 207.

The duplexer 207 transmits the combined signal that has undergone frequency conversion by the transmitting RF section 206 to a base station apparatus via an antenna 208. The duplexer 207 also outputs a signal transmitted by a base station apparatus and received via the antenna 208 (received signal) to a receiving RF section 209.

The receiving RF section 209 converts the frequency of a received signal from the duplexer 207 to baseband, and outputs the received signal converted to baseband to the adaptive despreader 210 and a despreader 213.

In accordance with an instruction from the requested modulation method determination section 201, the adaptive despreader 210 despreads the received signal from the receiving RF section 209, extracts components other than the pilot signal (components corresponding to data) in the received signal, and outputs the extracted components to the adaptive demodulator 211. In accordance with an instruction from the requested modulation method determination section 201, the adaptive demodulator 211 demodulates the components extracted by the adaptive despreader 210, and generates a demodulated signal. The adaptive decoding section 212 obtains receive data by decoding the demodulated signal from the adaptive demodulator 211 in accordance with an instruction from the requested modulation method determination section 201.

Meanwhile the despreader 213 despreads the received signal from the receiving RF section 209, extracts the pilot signal component in the received signal, and outputs the extracted pilot signal component to the CIR measurement section 214. Using the pilot signal component from the despreader 213, the CIR measurement section 214 measures the CIR and outputs the measured CIR to the requested modulation method determination section 201 and margin calculator 202.

Next, operations performed between the base station apparatus shown in FIG. 2 and the communication terminal apparatus shown in FIG. 3 will be described.

First, at the start of communication, in the base station a pilot signal is modulated by a modulator 106, spread by a spreader 107, and output to the multiplexer 108. Only the despread pilot signal is output from the multiplexer 108 to the power controller 109. The pilot signal from the multiplexer 108 is amplified by the power controller 109 so as to attain a predetermined transmission power value. The amplified pilot signal is frequency-converted to a radio frequency by the transmitting RF section 110, and is transmitted to communication terminal apparatuses from the antenna 112 via the duplexer 111. This pilot signal is transmitted to the communication terminal apparatuses via a control channel.

The pilot signal (control channel signal) transmitted by the base station apparatus is received at the antenna 208 of the communication terminal apparatus. The signal received by the antenna 208 (received signal) is output to the receiving RF section 209 via the duplexer 207. The received signal from the duplexer 207 is frequency-converted to baseband by the receiving RF section 209, and despread by the despreader 213. By this means, the pilot signal in the received signal is extracted by the despreader 213. The extracted pilot signal is output to the CIR measurement section 214.

In the CIR measurement section 214, the CIR is measured based on the pilot signal output by the despreader 213. The measured CIR is sent to the requested modulation method determination section 201 and margin calculator 202.

Figure 4:
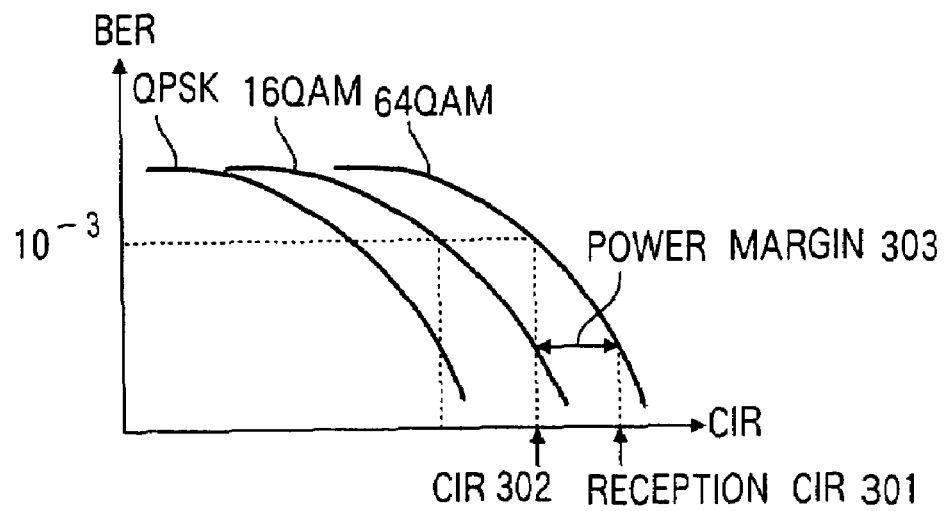
FIG. 4 is a diagram showing the method of transmission rate determination by the requested modulation method determination section of a communication terminal apparatus according to Embodiment 1 of the present invention.

In the requested modulation method determination section 201, a transmission rate at which it is possible for this communication terminal apparatus to receive at the desired quality is determined based on the CIR measured by the CIR measurement section 214. The transmission rate determination method used by the requested modulation method determination section 201 will now be described using FIG. 4. FIG. 4 is a diagram showing the method of transmission rate determination by the requested modulation method determination section 201 of a communication terminal apparatus according to Embodiment 1 of the present invention.

In the requested modulation method determination section 201, based on the CIR (reception quality) measured by the CIR measurement section 214, a transmission rate to be requested of the base station is determined so that the received signal characteristics (error rate characteristics) of this communication terminal apparatus meet the desired quality, and data transmission efficiency is optimal.

Specifically, when, for example, the CIR measured by the CIR measurement section 214 is a value as shown in FIG. 4 (reception CIR 301), transmission rates at which the received signal characteristics of this communication terminal apparatus meet the desired quality (assuming a Bit Error Rate (BER) of $10^{-3}$) are any of the following: the transmission rate for QPSK, the transmission rate for 16QAM, and the transmission rate for 64QAM. Of these transmission rates, the transmission rate at which data transmission efficiency is optimal is that for 64QAM. As a result, when a CIR such as that shown in FIG. 4 is measured, the transmission rate for 64QAM is determined as the transmission rate to be requested of the base station apparatus.

The transmission rate determined by the requested modulation method determination section 201 as described above is output to the margin calculator 202 and DRC signal creation section 203. After the transmission rate has been determined, a signal indicating the spreading code by which a received signal is to be multiplied, a signal indicating the received signal modulation method, and a signal indicating the received signal decoding method are output from the requested modulation method determination section 201 to the adaptive despreader 210, adaptive demodulator 211, and adaptive decoding section 212, respectively.

In the margin calculator 202, a power margin is calculated using the CIR measured by the CIR measurement section 214 and the transmission rate determined by the requested modulation method determination section 201. That is to say, in the margin calculator 202, the transmission rate determined by the requested modulation method determination section 201 is first applied, and the difference between reception quality when transmission is performed from the base station at the requested transmission rate (hereinafter referred to as "first reception quality") and the minimum reception quality necessary for the received signal characteristics in this case to meet the desired quality (hereinafter referred to as "second reception quality") is calculated. A power margin is then calculated as a power value corresponding to the calculated difference. This power margin is equivalent to the difference between the transmission power value in the base station apparatus necessary in order for this communication terminal apparatus to obtain the first reception quality (normally transmitted transmission power) and the transmission power value in the base station apparatus necessary for this communication terminal apparatus to obtain the second reception quality.

Specifically, with reference to FIG. 4, the minimum second reception quality (CIR 302) necessary for the received signal characteristics to meet the desired quality (BER=$10^{-3}$) is first calculated in accordance with a curve showing the CIR vs BER characteristic of the transmission rate determined by the requested modulation method determination section 201 (transmission rate for 64QAM). The difference between the first reception quality (reception CIR 301) and second reception quality (CIR 302) is then calculated, and then the power value corresponding to the calculated difference is calculated as the power margin 303.

In order to calculate the power margin, it is also possible to first calculate the transmission power value in the base station apparatus necessary for this communication terminal apparatus to obtain the first reception quality, and the transmission power value in the base station apparatus necessary for this communication terminal apparatus to obtain the second reception quality, and then calculate the difference between the transmission power values.

Information relating to a power margin calculated as described above is output to the combiner 215 as power margin information.

In the DRC signal creation section 203, a DRC signal indicating the transmission rate calculated by the requested modulation method determination section 201 is created. The created DRC signal is output to the combiner 215.

In the combiner 215, a combined signal is generated by combining the DRC signal from the DRC signal creation section 203 and power margin information from the margin calculator 202. The generated signal is output to the modulator 204.

The combined signal is modulated by the modulator 204, spread by the spreader 205, frequency-converted to a radio frequency by the transmitting RF section 206, and transmitted to the base station apparatus by the antenna 208 via the duplexer 207.

The signal transmitted by the communication terminal apparatus is received by the antenna 112 of the base station apparatus. The signal received by the antenna 112 (received signal) is output to the receiving RF section 113 via the duplexer 111. The received signal from the duplexer 111 is frequency-converted to baseband by the receiving RF section 113, despread by the despreader 114, and demodulated by the demodulator 115. As a result, a demodulated signal is generated by the demodulator 115. The generated demodulated signal is output to the DRC signal detector 116 and power margin information detector 117.

In the power margin information detector 117, power margin information is detected from the demodulated signal from the demodulator 115. The detected power margin information is output to the power setting section 118.

In the power setting section 118, the power margin of each communication terminal apparatus is recognized by means of the detected power margin information. In the power setting section 118, also, a transmit signal transmission power value is set for each communication terminal apparatus, taking account of the recognized power margin of the communication terminal apparatuses. Specifically, whereas in conventional adaptive modulation communication the transmit signal transmission power of each communication terminal apparatus is always taken as a predetermined transmission power value (constant), in this embodiment a value obtained by subtracting the power margin of a communication terminal apparatus from a predetermined transmission power value is set as the transmit signal transmission power value of that communication terminal apparatus. A communication terminal apparatus transmit signal transmission power value set in this way is equivalent to the transmission power value of the base station apparatus necessary for that communication terminal apparatus to obtain the second reception quality when the transmission rate requested by that communication terminal apparatus is applied.

The transmit signal transmission power values of each communication terminal apparatus set by the power setting section 118 in this way are output to the power controller 109.

Meanwhile, in the DRC signal detector 116, a DRC signal is detected from the demodulated signal generated by the demodulator 115. The detected DRC signal is output to the allocation section 101.

In the allocation section 101, communication resource allocation to each communication terminal apparatus is carried out based on the DRC signal transmitted by each communication terminal apparatus. Downlink transmit data sent from the base station apparatus to a communication terminal apparatus is stored in the buffer 102 until communication resource allocation is carried out.

Downlink transmit data output from the buffer 102 is coded by the adaptive coding section 103 using a coding method enabling reception by a communication terminal apparatus, demodulated by the adaptive modulator 104 using a demodulation method enabling reception by a communication terminal apparatus, spread by the adaptive spreader 105 using a spreading code enabling reception by a communication terminal apparatus, and output to the multiplexer 108. In the multiplexer 108, a transmit signal is generated by having a spread pilot signal in the spread downlink transmit data time-multiplexed.

The transmit signal generated by the multiplexer 108 is amplified in the power controller 109 so as to attain the transmission power value set by the power setting section 118. The amplified transmit signal is frequency-converted to a radio frequency by the transmitting RF section 110, and transmitted to communication terminal apparatuses by the antenna 112 via the duplexer 111.

The signal transmitted by the base station apparatus is received by the antenna 208 of the communication terminal apparatus. The signal received by the antenna 208 (received signal) is output to the receiving RF section 209 via the duplexer 207. The received signal from the duplexer 207 is frequency-converted to baseband by the receiving RF section 209, and despread by the adaptive despreader 210. By this means, components other than the pilot signal (components corresponding to data) in the received signal are extracted by the adaptive despreader 210. The extracted non-pilot-signal components are demodulated by the adaptive demodulator 211 and decoded by the adaptive decoding section 212. By this means, received data is obtained.

Figure 5:
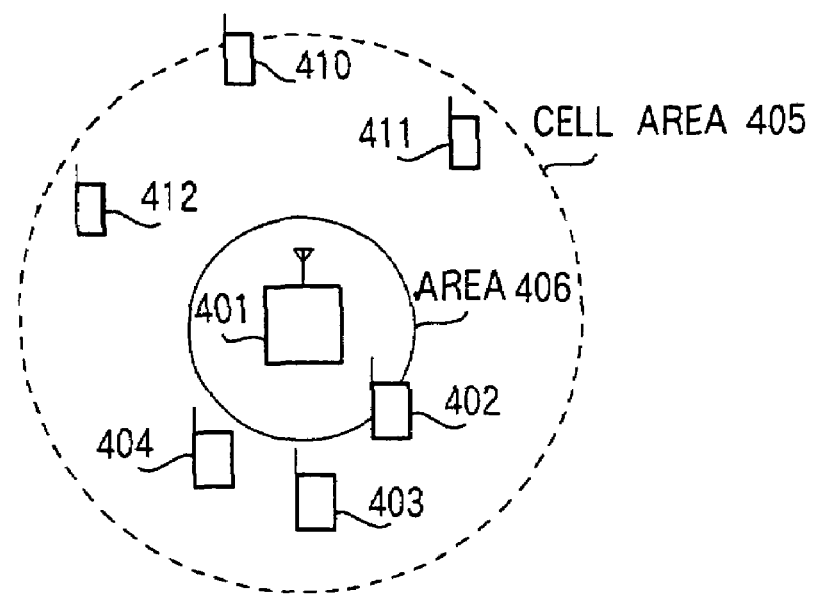
FIG. 5 is a diagram showing how a communication terminal apparatus and base station apparatus according to Embodiment 1 of the present invention perform adaptive modulation communication.

Next, the effects of a communication terminal apparatus according to this embodiment will be described with reference to FIG. 5. FIG. 5 is a diagram showing how a communication terminal apparatus and base station apparatus according to Embodiment 1 of the present invention perform adaptive modulation communication.

In FIG. 5, the base station apparatus 401 corresponds to the base station apparatus shown in FIG. 2, and communication terminal apparatuses 402 through 404 and communication terminal apparatuses 410 through 412 correspond to the communication terminal apparatuses shown in FIG. 3. It is assumed that the base station apparatus 401 is currently performing communication with communication terminal apparatuses 402 through 404, which are within the cell area 405 covered by this base station apparatus 401. It is also assumed that communication terminals 410 through 412 are within the range of the cell area 405, but are performing communication with a base station other than this base station 401. As cell areas are normally designed so as to overlap, communication terminal apparatuses 410 through 412 are within the an area that overlaps the cell area of base station apparatus 401 and the cell area of a base station other than base station apparatus 401.

As described above, the base station apparatus 401 performs scheduling based on the communication mode selected by communication terminal apparatuses 402 through 404, sets a transmission rate for each communication terminal apparatus, and notifies a signal indicating communication resource allocation to communication terminal apparatuses 402 through 404 via a control channel. The base station apparatus 401 then transmits data only to the relevant communication terminal apparatus in its assigned time via a data channel.

Here, as an example, the time will be considered in which the base station apparatus 401 transmits data to communication terminal apparatus 402. According to the conventional method, when the base station apparatus 401 transmits data to a predetermined communication terminal apparatus, it uses transmission power high enough to ensure that reception quality is sufficiently good at all communication terminal apparatuses in the cell area 405. In this case, as described above, a communication terminal apparatus among communication terminal apparatuses 410 through 412 receiving data from another base station apparatus will receive interference due to a signal transmitted to communication terminal apparatus 402 from base station apparatus 401.

However, in this embodiment, base station apparatus 401 does not transmit data to communication terminal apparatus 402 using a transmission power value high enough to ensure that reception quality is sufficiently good at all communication terminal apparatuses in the cell area 405. That is to say, when base station apparatus 401 applies the transmission rate requested by communication terminal apparatus 402, its transmits data to communication terminal apparatus 402 using the minimum transmission power value necessary to ensure that the received signal characteristics of communication terminal apparatus 402 meet the desired quality. This minimum necessary transmission power value is equivalent to the minimum transmission power value necessary to ensure that the reception quality of a communication terminal apparatus within area 406 meets the desired quality.

If base station apparatus 401 transmits data to communication terminal apparatus 402 using this kind of transmission power value, interference received by communication terminal apparatuses 410 through 412 that receive data from another base station apparatus due to a signal transmitted by base station apparatus 401 to communication terminal apparatus 402 will be suppressed. At this time, communication terminal apparatus 402 can obtain a received signal that meets the desired quality.

Also, it goes without saying that base station apparatus 401 and communication terminal apparatuses 402 through 404 perform ordinary CDMA communication in parallel in a different band from that for adaptive modulation communication.

In this embodiment, a case has been described where a base station apparatus transmits data to only one communication terminal apparatus at one time, but the present invention can also be applied to a case where a base station apparatus transmits data to a plurality of communication terminal apparatuses at the same time. In this case, it is possible to suppress mutual interference of delayed waves of signals transmitted from the base station apparatus to a plurality of communication terminal apparatuses, thereby enabling good communication quality to be maintained for a plurality of communication terminal apparatuses.

Thus, in this embodiment, when adaptive modulation communication is performed a base station apparatus does not transmit data to a communication terminal apparatus using a transmission power value that ensures that reception quality is sufficiently good at all communication terminal apparatuses within the cell covered by that base station apparatus, but instead transmits data to a communication terminal apparatus using the minimum transmission power value necessary to ensure that the received signal characteristics of that communication terminal apparatus meet the desired quality. By this means it is possible to maintain the quality of a received signal in a communication terminal apparatus at the desired quality while suppressing interference with communication terminal apparatuses, among the communication terminal apparatuses within the area covered by that base station apparatus, that perform adaptive modulation communication with another base station apparatus.

Also, in this embodiment, a case has been described, as an example, where a communication terminal apparatus determines a transmission rate and power margin based on measured reception quality, and reports the determined transmission rate and power margin to a base station apparatus, after which the base station apparatus sets a transmission power value of a transmit signal for that communication terminal apparatus using the reported transmission rate and power margin, but it is also possible for a communication terminal apparatus to report a measured reception quality to a base station apparatus, and for the base station apparatus to set a transmission power value of a transmit signal for that communication terminal apparatus using a transmission rate and power margin determined based on the reported reception quality. By this means it is possible to hold down the scale and power consumption of a communication terminal apparatus.

Moreover, transmission of a power margin from a communication terminal apparatus may be performed only when DRC of the fastest data rate is requested. By this means it is possible to hold down the scale and power consumption of a communication terminal apparatus. In this case, being able to request a high transmission rate means that the CIR is good, and therefore the probability of being located near a base station is high. Thus, base station transmission power can be greatly reduced, which is highly effective in preventing interference.

Embodiment 2

In this embodiment, a case is described where reduction of transmission power is taken into consideration beforehand when DRC selection is performed in a communication terminal apparatus. This embodiment is described below.

Figure 6:
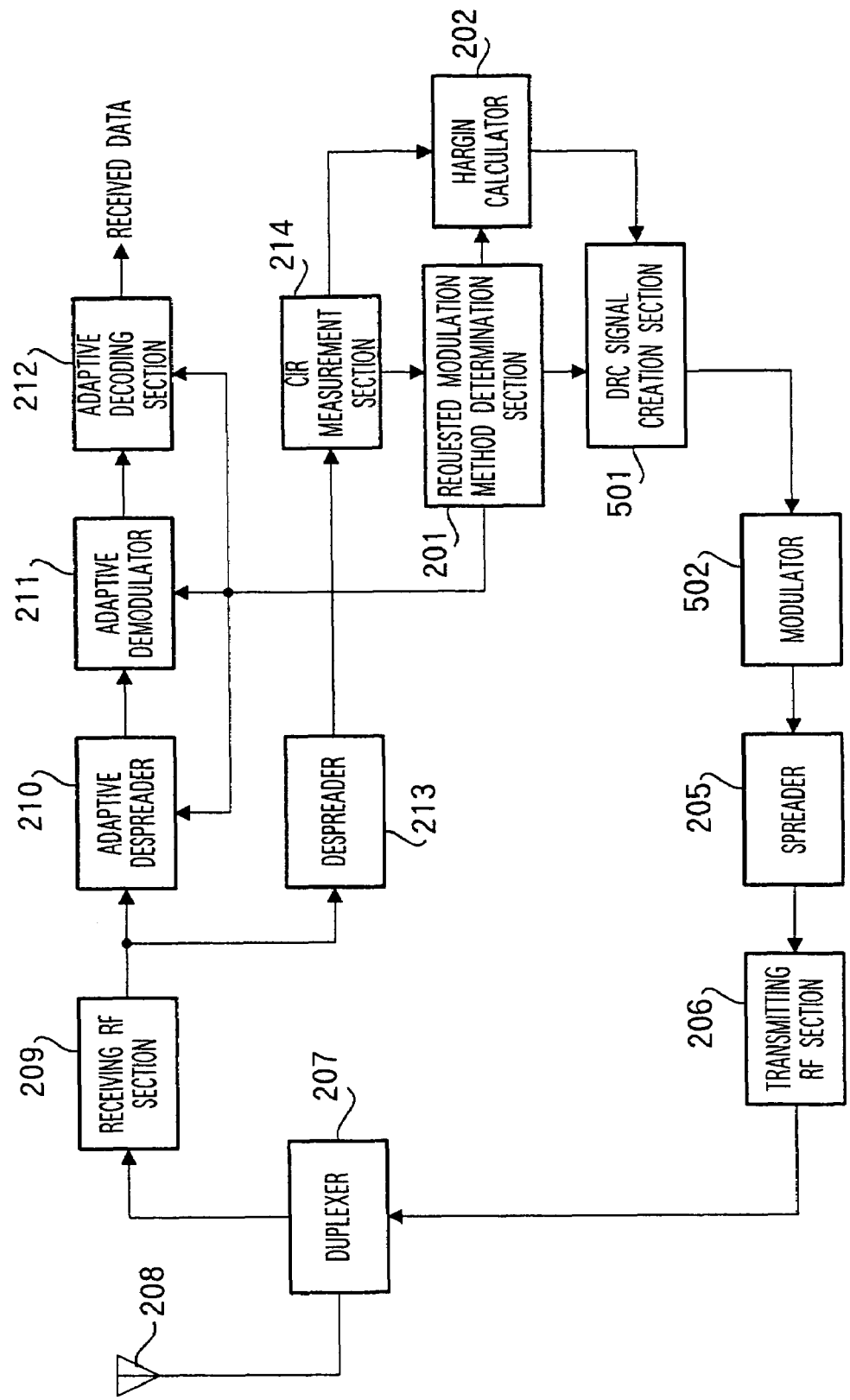
FIG. 6 is a block diagram showing the configuration of a communication terminal apparatus according to Embodiment 2 of the present invention.

First, the configuration of a communication terminal apparatus according to this embodiment will be described with reference to FIG. 6. FIG. 6 is a block diagram showing the configuration of a communication terminal apparatus according to Embodiment 2 of the present invention. Parts in FIG. 6 identical to those in Embodiment 1 (FIG. 3) are assigned the same codes as in FIG. 3 and their detailed explanations are omitted.

In FIG. 6, a DRC signal creation section 501 creates a DRC signal using a transmission rate determined by a requested modulation method determination section 201 and power margin information output from a margin calculator 202. The DRC signal creation section 501 also outputs the created DRC signal to a modulator 502. A detailed description of the DRC signal in this embodiment will be given later herein.

The modulator 502 modulates the DRC signal from the DRC signal creation section 501 and outputs the resulting signal to a spreader 205.

Figure 7:
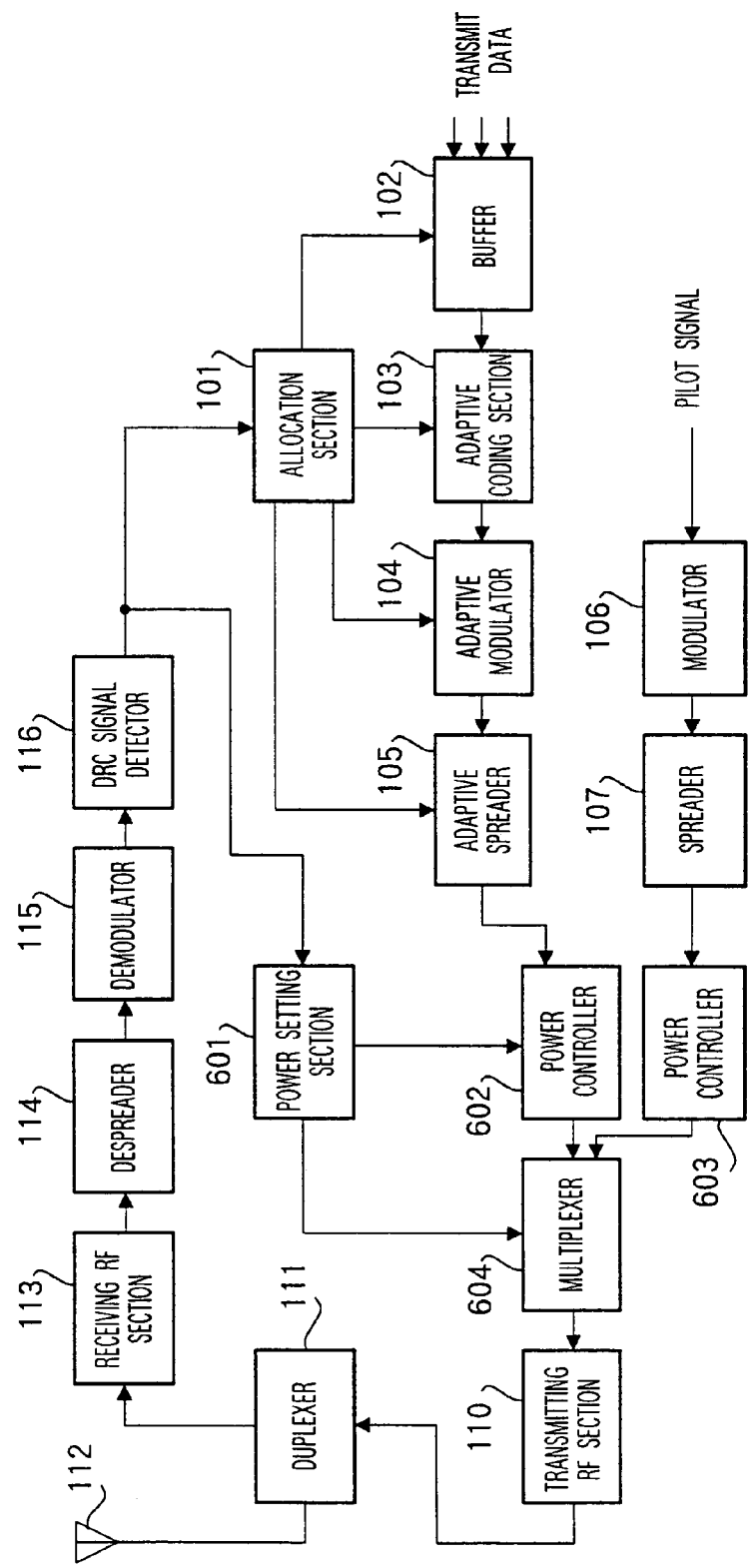
FIG. 7 is a block diagram showing the configuration of a base station apparatus according to Embodiment 2 of the present invention.

Next, the configuration of a base station apparatus according to this embodiment will be described with reference to FIG. 7. FIG. 7 is a block diagram showing the configuration of a base station apparatus according to Embodiment 2 of the present invention. Parts in FIG. 7 identical to those in Embodiment 1 (FIG. 2) are assigned the same codes as in FIG. 2 and their detailed explanations are omitted.

In FIG. 7, a power setting section 601 sets a transmit signal transmission power value for each communication terminal apparatus using the DRC signal detected by a DRC signal detector 116, and outputs the set transmission power values to a power controller 602.

Power controller 602 amplifies transmit data spread by an adaptive spreader 105 so as to attain the transmission power value set by the power setting section 601, and outputs the amplified transmit data to a multiplexer 604.

A power controller 603 amplifies a pilot signal spread by a spreader 107 so as to attain a predetermined (constant) transmission power value, and outputs the amplified pilot signal to the multiplexer 604.

The multiplexer 604 generates a multiplex signal by multiplexing the transmit data amplified by power controller 602 with the pilot signal amplified by power controller 603, and outputs the generated multiplex signal to a transmitting RF section 110.

Next, operations performed between the communication terminal apparatus shown in FIG. 6 and the base station apparatus shown in FIG. 7 will be described. Descriptions of operations in this embodiment that are identical to those in Embodiment 1 are omitted, and only operations in this embodiment that differ from those in Embodiment 1 are described.

In FIG. 6, a transmission rate at which a communication terminal apparatus can receive at the desired quality is determined by the requested modulation method determination section 201 based on a CIR measured by the CIR measurement section 214, as described in Embodiment 1. The transmission rate determined by the requested modulation method determination section 201 is output to the margin calculator 202 and DRC signal creation section 501.

In the margin calculator 202, a power margin is calculated using the CIR measured by the CIR measurement section 214 and the transmission rate determined by the requested modulation method determination section 201, as described in Embodiment 1. Information relating to the calculated power margin is output to the DRC signal creation section 501 as power margin information.

In the DRC signal creation section 501, a DRC signal is created using the transmission rate determined by the requested modulation method determination section 201 and power margin information from the margin calculator 202. Specifically, a DRC table showing DRC signals corresponding to transmission rates and power margin information is provided beforehand in the DRC signal creation section 501, and a DRC signal is determined unconditionally based on the transmission rate from the requested modulation method determination section 201 and power margin information from the margin calculator 202.

Whereas a DRC signal in Embodiment 1 "indicates a transmission rate at which reception is possible by a communication terminal apparatus at the desired quality", in this embodiment a DRC signal indicates "(1) a transmission rate at which reception is possible by a communication terminal apparatus at the desired quality and (2) the power margin when this transmission rate is selected (this power margin being of the same kind as that in Embodiment 1)".

Figure 8:
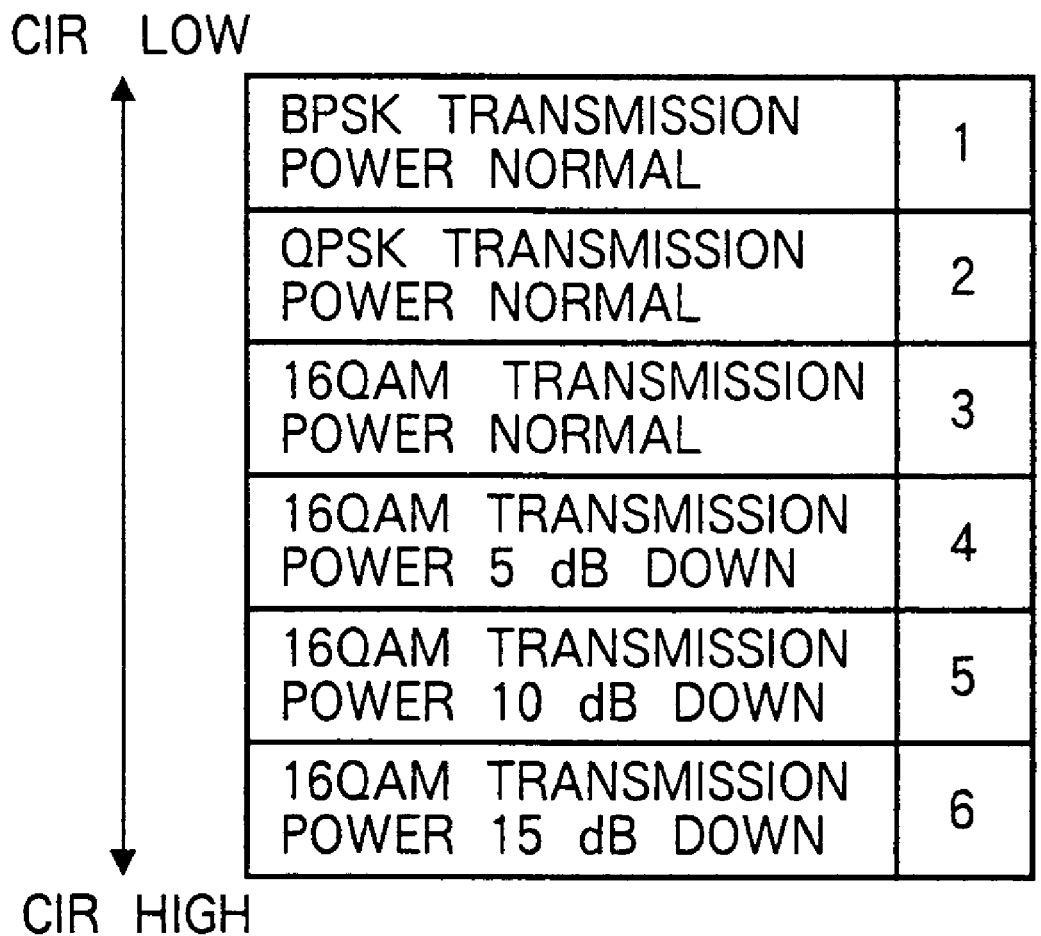
FIG. 8 is a diagram showing an example of a DRC table used by a communication terminal apparatus according to Embodiment 2 of the present invention.

An actual example of a DRC table used by the DRC signal creation section 501 will now be described with reference to FIG. 8. FIG. 8 is a diagram showing an example of a DRC table used by a communication terminal apparatus according to Embodiment 2 of the present invention.

In the DRC table shown in FIG. 8, DRC signals (1 through 6) are given correspondence to the modulation method (BPSK, QPSK, 16QAM, etc.) corresponding to the transmission rate determined by the requested modulation method determination section 201 and power margin information (0, 5, 10, 15 [dB], etc.) from the margin calculator 202.

For example, when a transmission rate for 16QAM is selected by the requested modulation method determination section 201 and a power margin of 5 [dB] is calculated by the margin calculator 202 (i.e. the desired quality can be met even if transmission power is decreased by 5 [dB]), a DRC signal with signal content of "4" is determined.

A DRC signal created by the DRC signal creation section 501 in this way is modulated by the modulator 502 and then output to the spreader 205.

In FIG. 7, a DRC signal detected by the DRC signal detector 116 is output to the allocation section 101 and power setting section 601. In the allocation section 101, the kind of processing described in Embodiment 1 is executed.

In the power setting section 601, a transmit signal transmission power value for each communication terminal apparatus is set based on the DRC signal from the DRC signal detector 116. Specifically, in the power setting section 601, the power margin corresponding to the DRC signal from the DRC signal detector 116 is recognized using the DRC table used by the communication terminal apparatus shown in FIG. 6. Also, the value obtained by subtracting this power margin from a predetermined transmission power value is set as the transmit signal transmission power value for this communication terminal apparatus.

For example, when the DRC signal of a particular communication terminal apparatus is "4", in the power setting section 601 it is recognized that a request to lower the transmission power value by 5 [dB] has been made by this communication terminal apparatus, and the transmission power value of this communication terminal apparatus is set as the value obtained by subtracting 5 [dB] from the predetermined transmission power value. The transmission power value set in this way is output to power controller 602.

In power controller 602, transmit data spread by the adaptive spreader 105 is amplified so as to attain the transmission power value set by the power setting section 601. The amplified transmit data is then output to the multiplexer 604.

In power controller 603, a pilot signal spread by the spreader 107 is amplified so as to always attain a predetermined (virtually constant) transmission power value. The amplified pilot signal is then output to the multiplexer 604.

The transmit data amplified by power controller 602 and pilot signal amplified by power controller 603 are multiplexed by the multiplexer 604. By this means a multiplex signal is generated. The generated multiplex signal is output to the transmitting RF section 110. This completes the operations performed between the communication terminal apparatus shown in FIG. 6 and the base station apparatus shown in FIG. 7.

As described above, in this embodiment a communication terminal apparatus does not transmit information indicating a transmission rate (modulation method) and information indicating a power margin individually to a base station apparatus (as in Embodiment 1), but instead a communication terminal apparatus transmits to a base station apparatus information indicating a combination of transmission rate (modulation method) and power margin. By this means it is possible to reduce the amount of information (transmission rate and transmission power value related information) transmitted by a communication terminal apparatus to a base station apparatus—that is to say, the amount of information in a radio channel.

For example, to consider the amount of information necessary for power margin transmission, in Embodiment 1, if the power margin handled is a 2-digit value (0 to 99 [dB]) at least 7 bits of information are necessary for the power margin alone, whereas in Embodiment 2, 16 kinds of information indicating a combination of transmission rate and power margin can be transmitted with only 4 bits of information.

Also, in this embodiment, having a base station apparatus always transmit a pilot signal (signal used as a reference when communication quality is measured in a communication terminal apparatus: reference signal) with a virtually constant transmission power value enables a communication terminal apparatus to measure communication quality accurately, thereby enabling DRC selection (modulation method and power margin selection) to be performed accurately.

Furthermore, if transmission of a pilot signal by a base station apparatus with an always virtually constant transmission power value is applied to Embodiment 1, the same kind of effect is obtained as in Embodiment 2.

In this embodiment of the present invention, a case has been described where a DRC table is used in which combinations of modulation method and power margin are set beforehand, but the contents of this DRC table (such as power reductions of 5 [dB] and 10 [dB] in the case of 16QAM transmission, for example) may also be reported in advance from a base station apparatus to a communication terminal apparatus by means of a broadcast channel before communication is carried out.

It is also possible to select the optimal power reduction by adaptively changing the DRC table contents for each communication terminal apparatus according to various conditions, such as communication quality, even during communication.

Moreover, in this embodiment, a case has been described where a DRC signal indicating a combination of transmission rate and power margin is transmitted, but it is also possible for a communication terminal apparatus to calculate a transmission power value in a base station apparatus based on a power margin, and transmit a DRC signal indicating a combination of transmission rate and this calculated transmission power value, and for the base station apparatus to set a transmission power value using the transmission power value in this DRC signal.

Embodiment 3

In this embodiment, a case is described where, when transmit data communications to communication terminal apparatuses with good communication quality become predominant in base station apparatus downlinks (data channels), the transmission power of the pilot signal and transmit data to all communication terminal apparatuses is reduced.

When transmit data communications to communication terminal apparatuses with good communication quality—that is, communication terminal apparatuses at locations near a base station apparatus (for example, communication terminal apparatuses reporting a DRC signal of 4 to 6 in FIG. 8)—are predominant in downlinks within the base station apparatus cell, it is probable that there will be few cases where a downlink is allocated to a communication terminal apparatus at the edge of this cell (a communication terminal apparatus at a location far from the base station apparatus). With the conventional method, even in a case such as this the base station apparatus transmits a pilot signal and transmit data using constant power capable of reaching all communication terminal apparatuses within the cell.

However, to consider firstly transmit data, in the above kind of case a base station apparatus transmits transmit data to a communication terminal apparatus at a location near that base station apparatus using constant power that ensures good reception quality at a communication terminal apparatus at a location far from that base station apparatus, even though there is little possibility of transmitting transmit data to that communication terminal apparatus at a location far from that base station apparatus. That is to say, the base station apparatus uses more than the necessary transmission power in transmitting transmit data to a communication terminal apparatus.

As a result, the base station apparatus imposes major interference on communication terminal apparatuses in a cell covered by another base station apparatus. Also, when the base station apparatus performs adaptive modulation communication with a plurality of communication terminal apparatuses at the same time, it imposes major interference on the plurality of communication terminal apparatuses in the cell covered by itself.

Secondly, to consider a pilot signal, in the above kind of case a base station apparatus transmits a pilot signal using power capable of reaching all communication terminal apparatuses within the cell. Here, there is little possibility of the base station apparatus transmitting transmit data to a communication terminal apparatus at a location far from that base station apparatus. Thus, to consider only the situation where transmit data communications to communication terminal apparatuses with good communication quality have become predominant in base station apparatus downlinks, there is little need for a base station apparatus to transmit a pilot signal to a communication terminal apparatus at a location far from that base station apparatus. Therefore, a base station apparatus can be said to use more than the necessary transmission power in transmitting a pilot signal.

Moreover, the use of more than the necessary transmission power by a base station apparatus in transmitting a pilot signal is equivalent to imposing interference on communication terminal apparatuses in the cell of another base station apparatus.

Thus, in this embodiment, in order to prevent the above-described problem, when transmit data communications to communication terminal apparatuses with good communication quality have become predominant in base station apparatus downlinks (that is, when downlink quality is excessive), the base station apparatus not only reduces the transmission power of transmit data for communication terminal apparatuses with good communication quality, but also reduces the transmit data transmission power and pilot signal transmission power for other communication terminal apparatuses to the same level as the transmit data transmission power for communication terminal apparatuses with good communication quality.

That is to say, a base station apparatus reduces its cell radius (as each communication terminal apparatus measures communication quality using the CIR of a pilot signal, reduction of the pilot signal transmission power by a base station apparatus is equivalent to having the base station apparatus reduce the size of its cell). In other words, a base station apparatus transmits transmit data in a concentrated fashion, using less power than the normal transmission power, to communication terminal apparatuses at locations near that base station apparatus from among communication terminal apparatuses selected as transmit data transmission destinations, and as regards communication terminal apparatuses at locations far from that base station apparatus, either has them accommodated in the cell of another base station apparatus, or performs transmit data transmission after transmit data transmission to communication terminal apparatuses at locations near the base station apparatus is completed.

By this means, a base station apparatus can suppress interference to other cells while performing communication of transmit data to communication terminal apparatuses with good communication quality in a concentrated fashion.

When transmit data communications to communication terminal apparatuses with good communication quality become few in number, the base station apparatus restores the transmit data transmission power and pilot signal transmission power to their original levels (restores the cell to its original size) and ensures that transmit data and the pilot signal reach all communication terminal apparatuses within the cell at sufficient quality. That is to say, at this time the base station apparatus notes that many of the communication terminal apparatuses selected as transmit data transmission destinations are communication terminal apparatuses at locations far from that base station apparatus, and restores the transmit data transmission power and pilot signal transmission power to their original levels.

By having all base station apparatuses perform transmission power control as described above, it is possible to reduce interference power between base station apparatuses. As a result, all base station apparatuses can reduce power consumption, enabling radio resources to be used more effectively.

Figure 9:
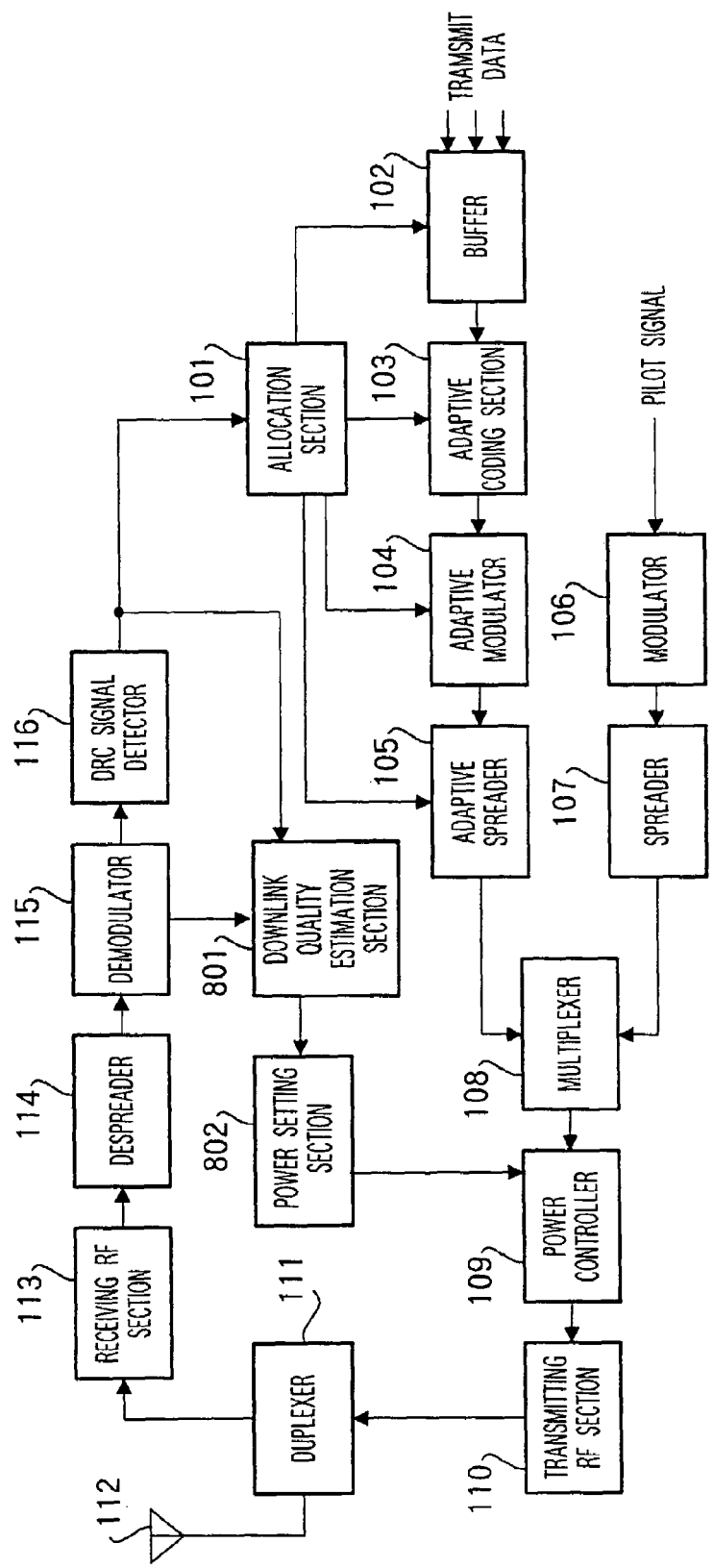
FIG. 9 is a block diagram showing the configuration of a base station apparatus according to Embodiment 3 of the present invention.

Next, the configuration of the above base station apparatus will be described with reference to FIG. 9. FIG. 9 is a block diagram showing the configuration of a base station apparatus according to Embodiment 3 of the present invention. Here, as an example, a case is described where the base station apparatus shown in FIG. 9 performs communication with the communication terminal apparatus shown in FIG. 6 using the DRC table shown in FIG. 8, but a communication terminal apparatus that performs communication with the base station apparatus shown in FIG. 9 may be of any kind as long as it has a configuration whereby a DRC signal is notified to the base station apparatus. Parts in FIG. 9 identical to those in FIG. 2 or FIG. 7 are assigned the same codes as in FIG. 2 or FIG. 7 and their detailed explanations are omitted.

As in Embodiment 1, an allocation section 101 determines communication resource allocation to each communication terminal apparatus based on a DRC signal (transmit data transmission is allocated preferentially to communication terminal apparatuses notifying a high DRC signal).

Using a DRC signal from a DRC signal detector 116, a downlink quality estimation section 801 recognizes how many communication terminal apparatuses are communication terminal apparatuses at locations near this base station apparatus—that is, communication terminal apparatuses with good communication quality (communication terminal apparatuses whose pilot signal CIR is greater than a predetermined value), and based on the result of this recognition, generates information indicating transmission power and outputs this to a power setting section 802.

The power setting section 802 sets a pilot signal and transmit data transmission power value based on information from the downlink quality estimation section 801, and outputs the set transmission power value to a power controller 109.

Figure 10:
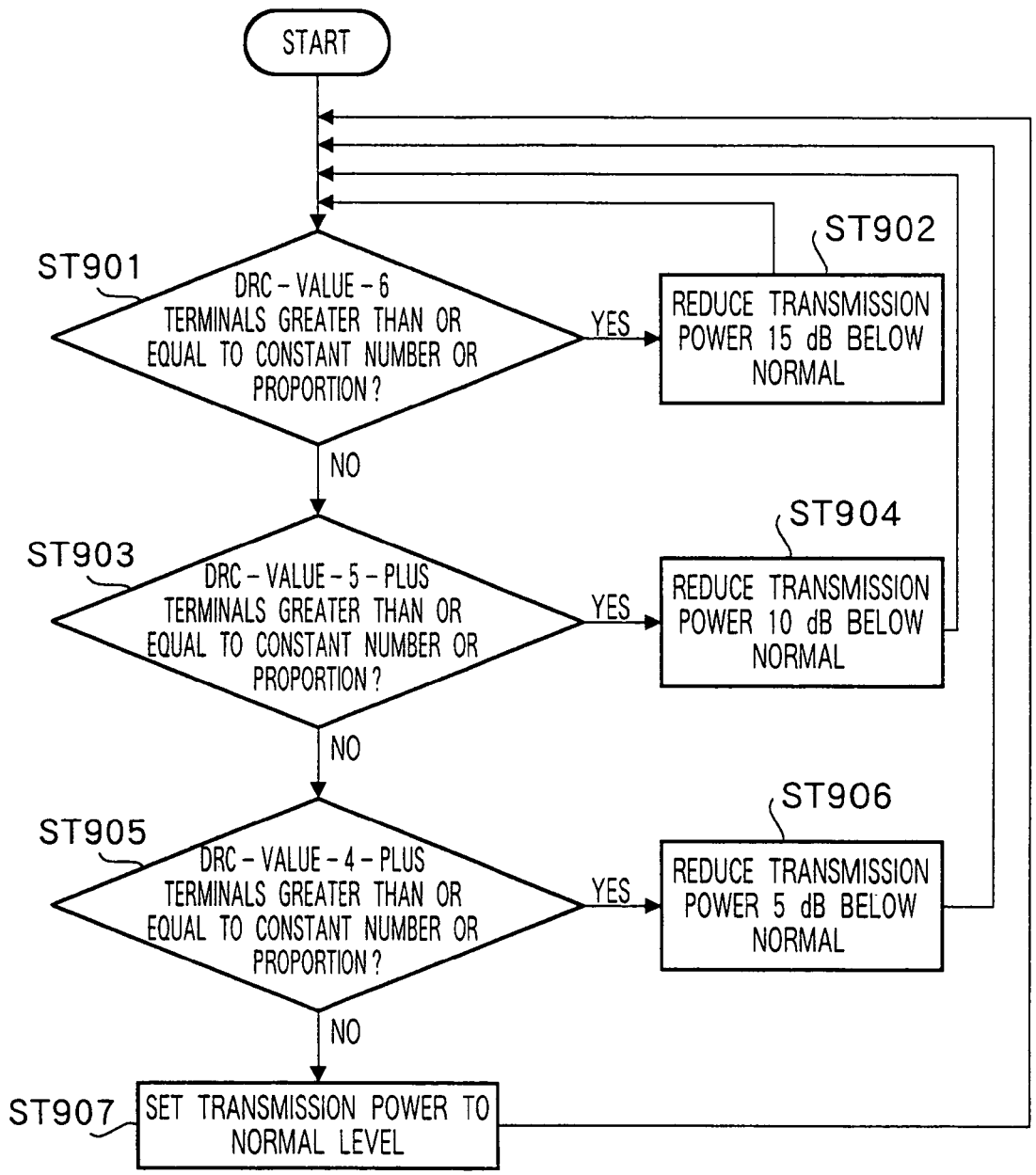
FIG. 10 is a flowchart showing the operation of a base station apparatus according to Embodiment 3 of the present invention.

Next, the operation of a base station apparatus with the above configuration will be described with reference to FIG. 9 and FIG. 10. FIG. 10 is a flowchart showing the operation of a base station apparatus according to Embodiment 3 of the present invention. Operations in this embodiment identical to operations in Embodiment 1 or Embodiment 2 are omitted.

In the downlink quality estimation section 801, first, as shown in step (hereinafter referred to as "ST") 901, when the number of communication terminal apparatuses reporting a DRC value of 6, or the proportion of communication terminal apparatuses reporting a DRC value of 6 among all communication terminal apparatuses that perform communication within the cell of this base station apparatus (hereinafter referred to as simply "the number or proportion of DRC-value-6 communication terminal apparatuses") exceeds a predetermined value, information indicating that the transmission power value is to be reduced by 15 [dB] below normal is output to the power setting section 802 as shown in ST902. When, on the other hand, the number or proportion of DRC-value-6 communication terminal apparatuses does not exceed the predetermined value, the processing flow proceeds to ST903.

In ST903, when the number or proportion of DRC-value-5-plus communication terminal apparatuses exceeds a predetermined value, information indicating that the transmission power value is to be reduced by 10 [dB] below normal is output to the power setting section 802 as shown in ST904. When, on the other hand, the number or proportion of DRC-value-5-plus communication terminal apparatuses does not exceed the predetermined value, the processing flow proceeds to ST905.

In ST905, when the number or proportion of DRC-value-4-plus communication terminal apparatuses exceeds a predetermined value, information indicating that the transmission power value is to be reduced by 5 [dB] below normal is output to the power setting section 802 as shown in ST906. When, on the other hand, the number or proportion of DRC-value-4-plus communication terminal apparatuses does not exceed the predetermined value, the processing flow proceeds to ST907.

In ST907, it is recognized that transmit data communications to communication terminal apparatuses with good communication quality are not predominant in base station apparatus downlinks, and information indicating that the transmission power value is to be restored to normal is output to the power setting section 802.

Thereafter, in the power setting section 802 the pilot signal and transmit data transmission power value is set based on information indicated by the downlink quality estimation section 801. That is to say, based on information from the downlink quality estimation section 801, the pilot signal and transmit data transmission power value is set by subtracting one or other of 15 [dB] (ST902), 10 [dB] (ST904), 5 [dB] (ST906), or 0 [dB] (ST907) from the normal transmission power value. It goes without saying that "normal transmission power value" here is equivalent to a transmission power value that enables all communication terminal apparatuses in the cell of this base station apparatus to receive at sufficient quality.

Setting a value to be subtracted from the normal transmission power value according to the size of the DRC value (ST902, St904, ST906, and ST907 in FIG. 10) is done in consideration of the fact that the optimal value of a transmission power value for a communication terminal apparatus differs according to the size of the DRC value reported by that communication terminal apparatus—that is, the distance of that communication terminal apparatus from the base station apparatus. By this means it is possible to reliably maintain good reception quality in communication terminal apparatuses that receive transmit data.

Thereafter, a transmit signal generated by a multiplexer 108 (a signal in which a pilot signal and transmit data for each communication terminal apparatus is multiplexed) is uniformly amplified by the power controller 109 so as to attain the transmission power value set by the power setting section 802, and is output to the transmitting RF section 110.

Next, the reason for reducing not only the transmission power value of transmit data for all communication terminal apparatuses but also the pilot signal transmission power value will be explained. If only the transmit data transmission power value were reduced and the pilot signal transmission power value were made the normal value, there would be a possibility of reception quality when receiving a pilot signal in communication terminal apparatuses in the cell of another base station apparatus being lower than reception quality when actually receiving transmit data. Thus, these communication terminal apparatuses would report to the base station apparatus a lower transmission rate than the actual transmission rate sufficient to meet the predetermined reception quality. As a result, the downlink total throughput (total transmit data transmitted to communication terminal apparatuses) in the above-mentioned other base station apparatus would fall.

Thus, in this embodiment, the transmit data and pilot signal transmission power values for all communication terminal apparatuses are reduced to the same level. By this means it is possible to prevent a fall in total throughput in another base station apparatus.

Thus, according to this embodiment, by having a base station apparatus determine the transmission power value of the pilot signal and transmit data for all communication terminal apparatuses according to the proportion of transmit data communications on downlinks to communication terminal apparatuses with good communication quality (located near the base station apparatus)—that is, the proportion of transmit data communications to communication terminal apparatuses with good communication quality on downlinks—it is possible to suppress interference to communication terminal apparatuses present in the cell of that base station apparatus and the cell of another base station apparatus, and also to improve downlink total throughput (the total amount of transmit data transmitted to communication terminal apparatuses).

Specifically, when the proportion of transmit data communications to communication terminal apparatuses with good communication quality on downlinks is large, by uniformly reducing the transmission power values of the pilot signal and transmit data for all communication terminal apparatuses it is possible to maintain reception quality in those communication terminal apparatuses with good communication quality while suppressing interference to communication terminal apparatuses present in the cell of the relevant base station apparatus and the cell of another base station apparatus.

When, on the other hand, the proportion of transmit data communications to communication terminal apparatuses with good communication quality on downlinks is small, since reception quality in many communication terminal apparatuses at locations far from the base station apparatus will degrade, and consequently downlink total throughput will fall, when the transmission power values of the pilot signal and transmit data for all communication terminal apparatuses are kept reduced, the transmission power values of the pilot signal and transmit data for all communication terminal apparatuses are made the normal values. By this means it is possible to increase downlink total throughput—that is, to improve transmission efficiency.

Embodiment 4

In above-described Embodiment 3, pilot signal and transmit data transmission power values are reduced according to the proportion of transmit data communications to communication terminal apparatuses with good communication quality on downlinks. However, reducing the transmit data transmission power value may lead to the generation of a large number of packets that are not received correctly by communication terminal apparatuses, and a fall in downlink total throughput, resulting in inefficient transmission.

Thus, in this embodiment, monitoring is carried out as to whether or not downlink total throughput can be maintained, and if downlink total throughput falls after the transmit data transmission power value is reduced, the transmit data transmission power value is made to approach the normal value.

Figure 11:
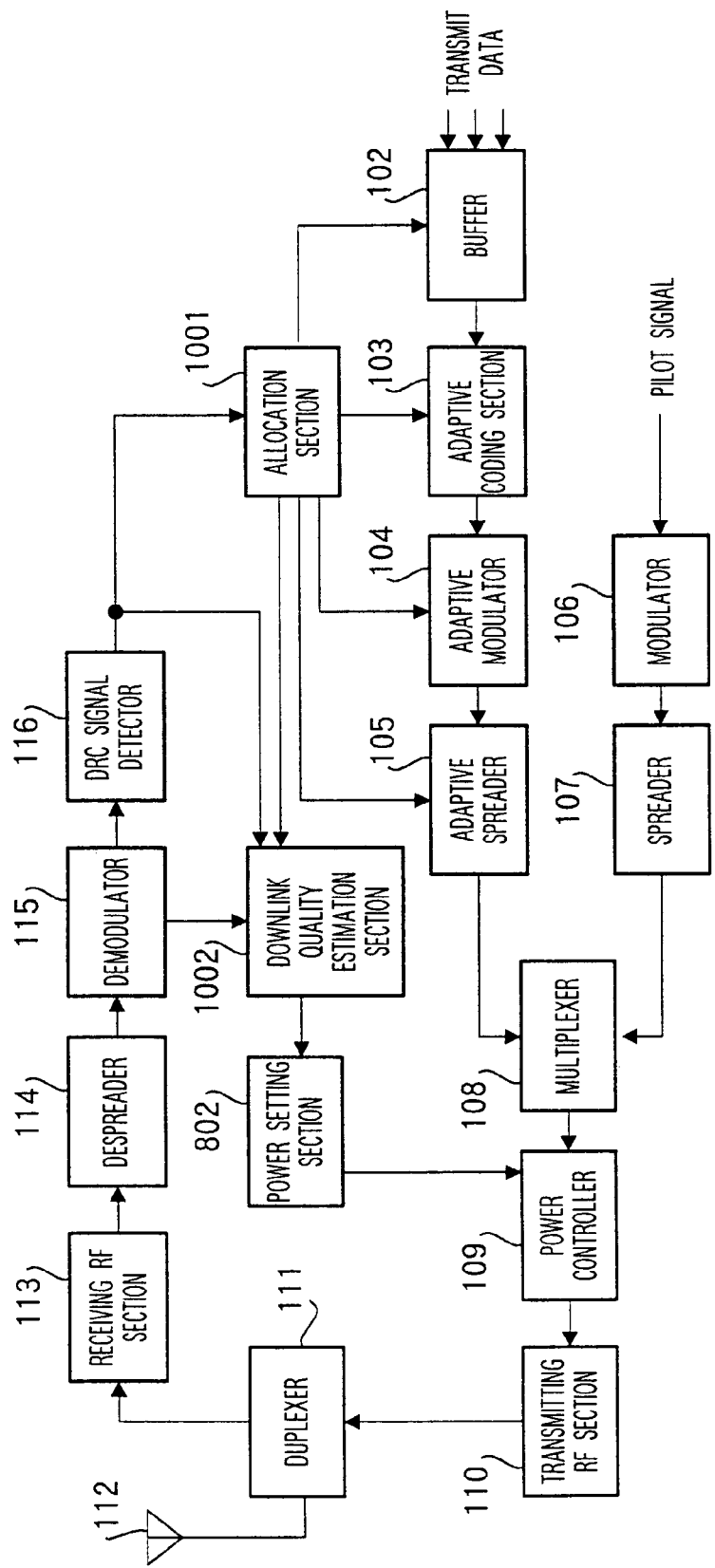
FIG. 11 is a block diagram showing the configuration of a base station apparatus according to Embodiment 4 of the present invention.

The configuration of a base station apparatus according to this embodiment will be described below with reference to FIG. 11. FIG. 11 is a block diagram showing the configuration of a base station apparatus according to Embodiment 4 of the present invention. Parts in FIG. 11 identical to those in Embodiment 3 (FIG. 9) are assigned the same codes as in FIG. 9 and their detailed explanations are omitted.

Allocation section 1001 in FIG. 11 has the same configuration as allocation section 101 in Embodiment 3, except for the following point. Namely, allocation section 1001 outputs the results of communication resource allocation to each communication terminal apparatus determined on the basis of a DRC signal (which transmission rate is to be used for transmission to which communication terminal apparatus) to a downlink quality estimation section 1002.

Downlink quality estimation section 1002 has the same configuration as downlink quality estimation section 801 in Embodiment 3, except for the following point. Namely, downlink quality estimation section 1002 monitors changes in overall downlink total throughput using allocation results from the allocation section 1001, generates information indicating transmission power based on the recognition results described in Embodiment 3 and these changes in total throughput, and outputs this information to a power setting section 802.

Figure 12:
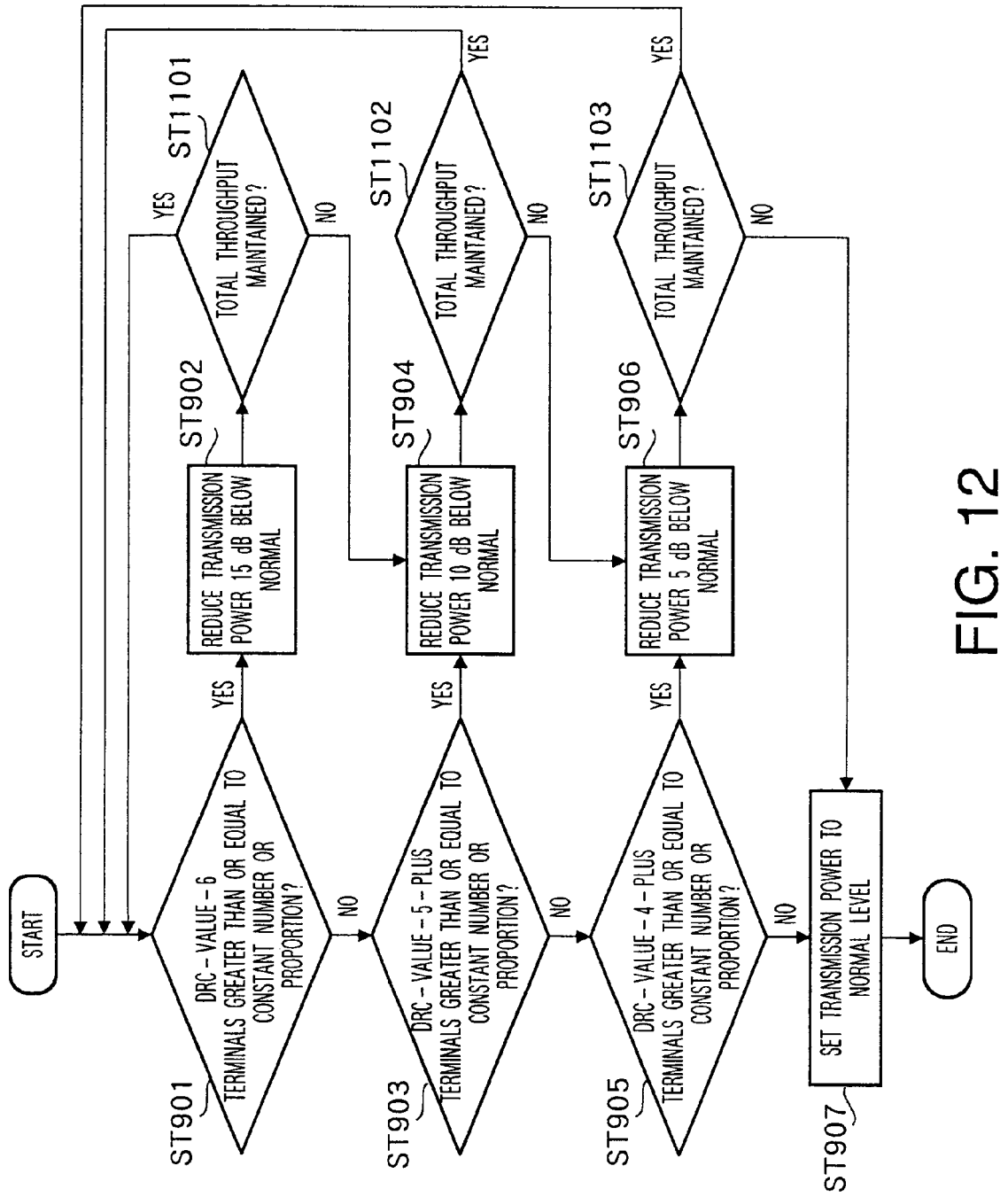
FIG. 12 is a flowchart showing the operation of a base station apparatus according to Embodiment 4 of the present invention.

Next, the operation of a base station apparatus with the above configuration will be described with reference to FIG. 11 and FIG. 12. FIG. 12 is a flowchart showing the operation of a base station apparatus according to Embodiment 4 of the present invention. Detailed explanations of operations in FIG. 12 identical to operations in FIG. 10 are omitted.

After the transmission power value has been reduced by 15 [dB] below normal in ST902, as shown in ST1101 the downlink quality estimation section 1002 monitors downlink total throughput based on allocation results from the allocation section 1001, and determines whether or not total throughput has fallen compared to prior to the reduction in transmission power. When total throughput is not fallen, the processing flow proceeds to above-described ST901. When total throughput is fallen, the processing flow proceeds to above-described ST904.

Similarly, after the transmission power value has been reduced by 10 [dB] below normal in ST904, as shown in ST1102 the downlink quality estimation section 1002 determines whether or not total throughput has fallen compared to prior to the reduction in transmission power. When total throughput is not fallen, the processing flow proceeds to above-described ST901. When total throughput is fallen, the processing flow proceeds to above-described ST906.

Similarly, again, after the transmission power value has been reduced by 5 [dB] below normal in ST906, as shown in ST1103 the downlink quality estimation section 1002 determines whether or not total throughput has fallen compared to prior to the reduction in transmission power. When total throughput is not fallen, the processing flow proceeds to above-described ST901. When total throughput is fallen, the processing flow proceeds to above-described ST907.

In this embodiment, a case has been described where, when total throughput after a reduction in the transmission power value cannot be maintained at the total throughput prior to the reduction in the transmission power value, the transmission power value is gradually made to approach the normal value (the transmission power value is gradually raised), but the transmission power value may also be restored directly to its normal value.

Thus, according to this embodiment, a fall in downlink total throughput caused by reducing the transmission power value can be prevented by causing the pilot signal and transmit data transmission power value to approach the normal value in accordance with changes in downlink total throughput. By this means it is possible to achieve efficient transmit data transmission.

Embodiment 5

In this embodiment, a case is described where a base station apparatus detects, based on the number of communication terminal apparatuses notifying a predetermined DRC signal, whether or not transmit data communications to communication terminal apparatuses with good communication quality (communication terminal apparatuses at locations near that base station apparatus) have become predominant in base station apparatus downlinks (that is, whether or not downlink quality is excessive), and furthermore changes the transmission power of the pilot signal and transmit data for all communication terminal apparatuses based on the result of detection.

In above-described Embodiment 3, detection is performed as to whether or not transmit data communications to communication terminal apparatuses with good communication quality have become predominant on downlinks within a base station apparatus cell, using the number of communication terminal apparatuses sending a predetermined DRC signal as a proportion of the total number of communication terminal apparatuses that are transmit data transmission destinations.

However, in a case where, for example, the total number of communication terminal apparatuses that are transmit data transmission destinations is small, there is a possibility of total throughput falling when the transmission power of the pilot signal and transmit data for all communication terminal apparatuses is reduced as a result of the above proportion exceeding a threshold value.

Thus, in this embodiment, detection is performed as to whether or not transmit data communications to communication terminal apparatuses with good communication quality have become predominant on downlinks, based on the number of communication terminal apparatuses notifying a predetermined DRC signal, and the transmission power of the pilot signal and transmit data for all communication terminal apparatuses is changed based on the result of this detection.

Specifically, when, for example, the number of communication terminal apparatuses notifying a predetermined DRC signal is greater than or equal to a threshold value, it is recognized that communications to communication terminal apparatuses with good communication quality have become predominant in downlinks, and in order to prevent transmission from being performed using more than the necessary transmission power, the transmission power is reduced. When, on the other hand, the number of communication terminal apparatuses notifying a predetermined DRC signal is less than the threshold value, it is recognized that many of the communication terminal apparatuses that are transmit data transmission destinations are at locations far from that base station apparatus, and transmission power is restored to the normal power value.

By this means it is possible to suppress interference to communication terminal apparatuses present in the cell of the relevant base station apparatus and the cell of another base station apparatus, and also to improve downlink total throughput.

Figure 13:
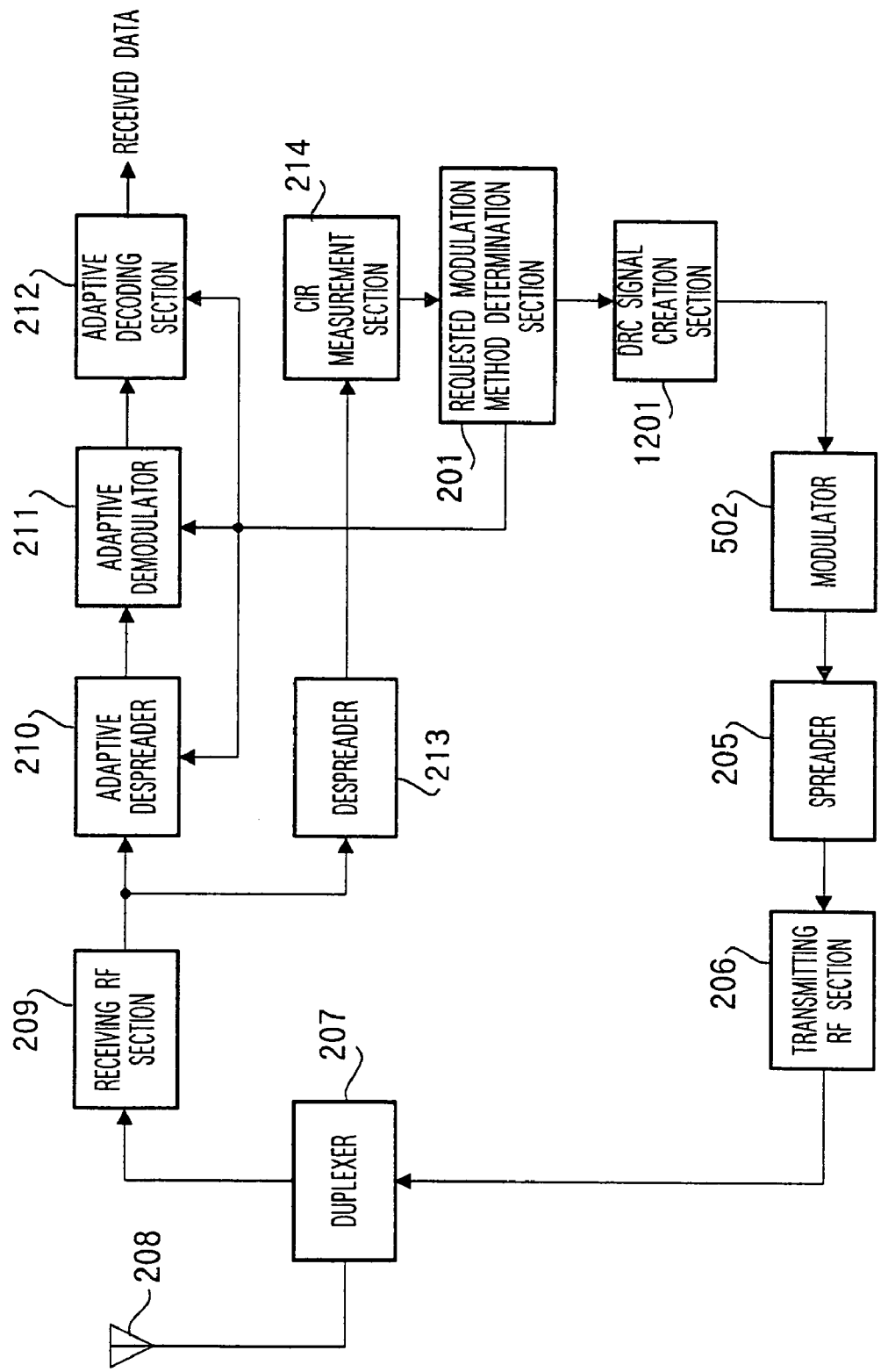
FIG. 13 is a block diagram showing the configuration of a communication terminal apparatus according to Embodiment 5 of the present invention.
Figure 14:
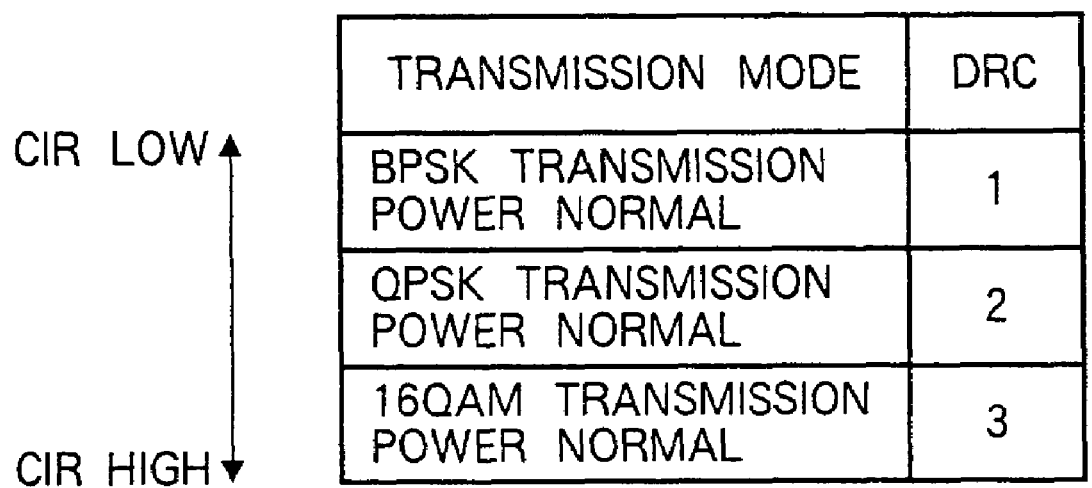
FIG. 14 is a diagram showing an example of a DRC signal used by a communication terminal apparatus according to Embodiment 5 of the present invention.
Figure 15:
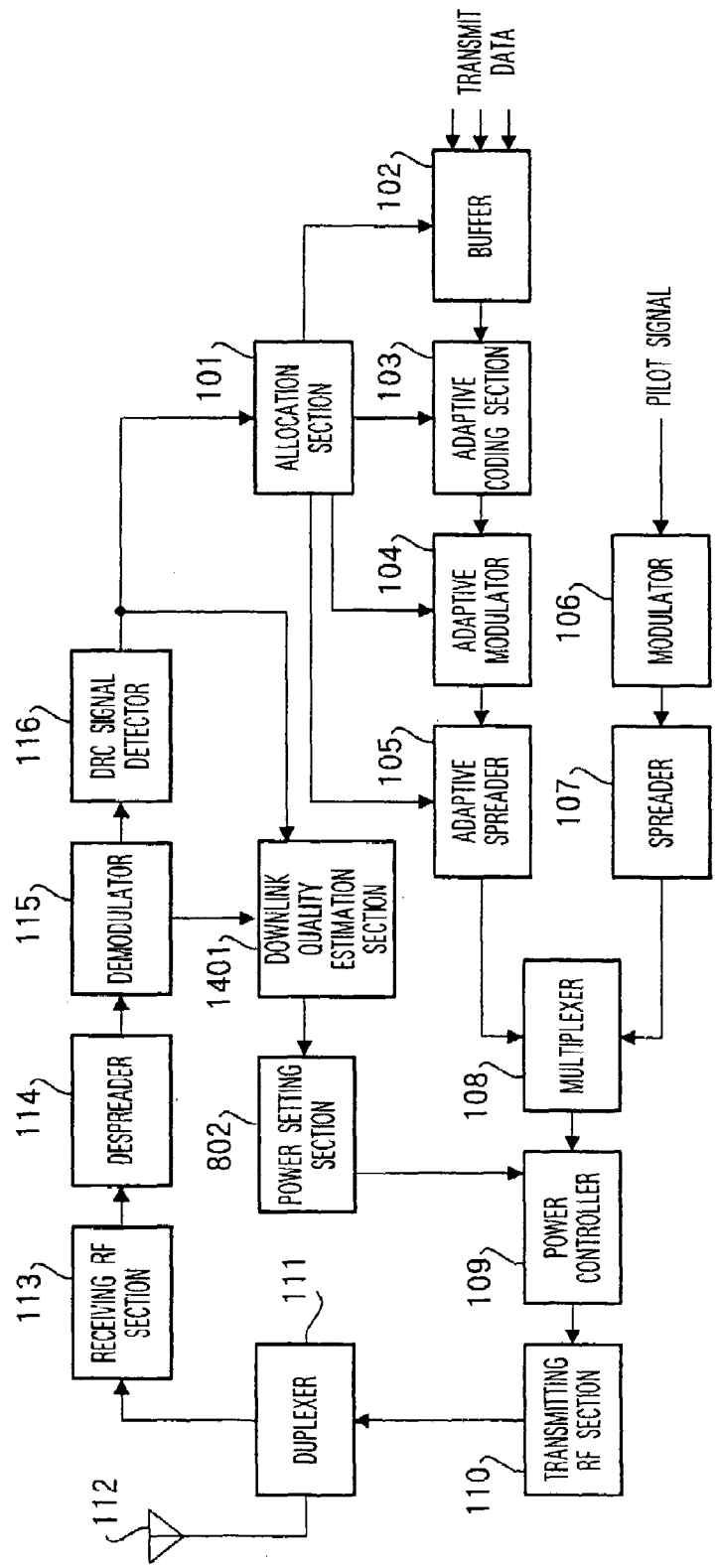
FIG. 15 is a block diagram showing the configuration of a base station apparatus according to Embodiment 5 of the present invention.

Next, the configurations of a communication terminal apparatus and base station apparatus according to this embodiment will be described with reference to FIG. 13 through FIG. 15. FIG. 13 is a block diagram showing the configuration of a communication terminal apparatus according to Embodiment 5 of the present invention, FIG. 14 is a diagram showing an example of a DRC signal used by a communication terminal apparatus according to Embodiment 5 of the present invention, and FIG. 15 is a block diagram showing the configuration of a base station apparatus according to Embodiment 5 of the present invention.

First, the configuration of a communication terminal apparatus will be described with reference to FIG. 13. Parts in FIG. 13 identical to those in FIG. 6 are assigned the same codes as in FIG. 6 and their detailed explanations are omitted.

A DRC signal creation section 1201 creates a DRC signal using a transmission rate determined by a requested modulation method determination section 201. Specifically, the DRC signal creation section 1201 has a DRC table (such as the DRC table shown in FIG. 14, for example) that shows DRC signals corresponding to transmission rates, and creates the DRC signal corresponding to the transmission rate determined by the requested modulation method determination section 201. This DRC signal creation section 1201 outputs the created DRC signal to a modulator 502.

Next, the configuration of a base station apparatus will be described with reference to FIG. 15. Parts in FIG. 15 identical to those in FIG. 9 are assigned the same codes as in FIG. 9 and their detailed explanations are omitted.

Using a DRC signal from a DRC signal detector 116, a downlink quality estimation section 1401 recognizes the number of communication terminal apparatuses at locations near this base station apparatus—that is, communication terminal apparatuses with good communication quality (communication terminal apparatuses whose pilot signal CIR is greater than a predetermined value), and compares the recognized number with a threshold value. This downlink quality estimation section 1401 generates information indicating transmission power based on the result of this comparison, and outputs this information to a power setting section 802.

Figure 16:
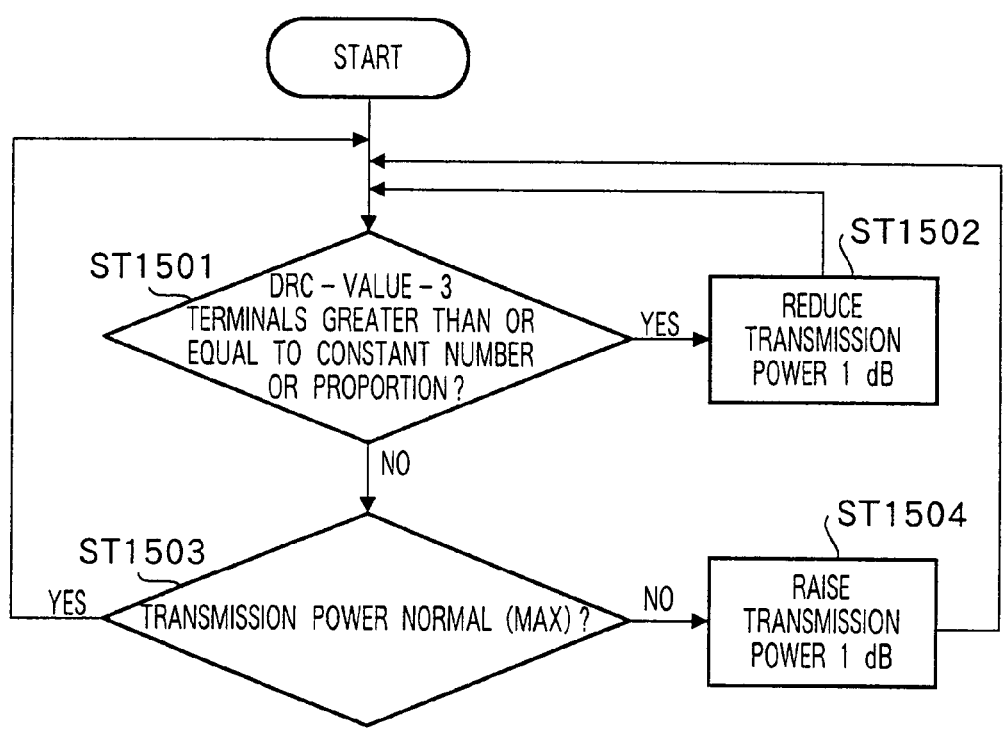
FIG. 16 is a flowchart showing the operation of a base station apparatus according to Embodiment 5 of the present invention.

Next, the operation of a communication terminal apparatus and base station apparatus with the above configurations will be described with reference to FIG. 16. FIG. 16 is a flowchart showing the operation of a base station apparatus according to Embodiment 5 of the present invention. Operations in this embodiment identical to operations in Embodiment 1 through Embodiment 4 are omitted.

In the communication terminal apparatus shown in FIG. 13, a DRC signal corresponding to the transmission rate determined by the requested modulation method determination section 201 is generated in the DRC signal creation section 1201 in accordance with the DRC table shown in FIG. 14. The generated DRC signal is output to the modulator 502.

Operations in the base station apparatus shown in FIG. 15 are as follows. First, as shown in ST1501, in the downlink quality estimation section 1401 the number of communication terminal apparatuses reporting a DRC value of 3 is recognized using the DRC signal from detector 116, and then the recognized number is compared with a threshold value.

When the result of this comparison is that the number of communication terminal apparatuses reporting a DRC value of 3 is greater than or equal to the threshold value, it is recognized that transmit data communications to communication terminal apparatuses with good communication quality (communication terminal apparatuses reporting a DRC value of 3) have become predominant in downlinks, and, as shown in ST1502, information indicating that transmission power is to be reduced by, for example, 1 [dB] is generated. When, on the other hand, the number of communication terminal apparatuses reporting a DRC value of 3 is less than the threshold value, it is recognized that many of the communication terminal apparatuses that are transmit data transmission destinations are at locations far from this base station apparatus, and the processing flow proceeds to ST1503.

In ST1503, it is determined whether or not the transmission power value at the current point in time is the normal transmission power value (maximum value). When the transmission power value at the current point in time is smaller than the normal transmission power value, information indicating that transmission power is to be raised by, for example, 1 [dB] is generated, as shown in ST1504. When, on the other hand, the transmission power value at the current point in time is the normal transmission power value, information indicating that transmission power is not to be changed is generated, and the processing flow proceeds to ST1501.

Information generated by the downlink quality estimation section 1401 as described above is output to the power setting section 802. In the power setting section 802, pilot signal and transmit data transmission power values are set based on the information indicated by the downlink quality estimation section 1401.

Thus, in this embodiment, a base station apparatus determines the transmission power value of the pilot signal and transmit data for all communication terminal apparatuses according to the number of communication terminal apparatuses with good communication quality (communication terminal apparatuses at locations near the base station apparatus), thereby making it possible to suppress interference to communication terminal apparatuses in the cell of that base station apparatus and the cell of another base station apparatus, and also to improve downlink total throughput.

Specifically, by uniformly reducing the transmission power value of the pilot signal and transmit data for all communication terminal apparatuses when the number of communication terminal apparatuses with good communication quality is greater than or equal to a threshold value, it is possible to maintain good reception quality in the above-mentioned communication terminal apparatuses with good communication quality while suppressing interference to communication terminal apparatuses in the cell of that base station apparatus and the cell of another base station apparatus.

When, on the other hand, the number of communication terminal apparatuses with good communication quality on downlinks is less than the threshold value, since reception quality in many communication terminal apparatuses at locations far from the base station apparatus will degrade, and consequently downlink total throughput will fall, if the transmission power values of the pilot signal and transmit data for all communication terminal apparatuses are kept reduced, the transmission power values of the pilot signal and transmit data for all communication terminal apparatuses are made to approach the normal transmission power value. By this means it is possible to increase downlink total throughput—that is, to improve transmission efficiency.

Moreover, according to this embodiment, when the total number of communication terminal apparatuses that are transmit data transmission destinations is small, transmission power is changed on the basis of the number of communication terminal apparatuses with good communication quality, thereby enabling a fall in downlink total throughput to be suppressed to a greater extent that in Embodiment 3.

In this embodiment, a case has been described, as an example, where a communication terminal apparatus notifies to a base station apparatus a DRC signal specifying only the modulation method, but it goes without saying that the present invention can also be applied to a case where a communication terminal apparatus notifies a DRC signal of the kind described in Embodiment 1 through Embodiment 4.

Also, in this embodiment, a case has been described where transmission power is changed on the basis of the number of communication terminal apparatuses with good communication quality in order to prevent a fall in downlink total throughput due to the fact that the total number of communication terminal apparatuses that are transmit data transmission destinations is small, but, as in Embodiment 3 it goes without saying that it is also possible to change transmission power based on the number of communication terminal apparatuses with good communication quality as a proportion of the total number of communication terminal apparatuses that are transmit data transmission destinations.

Embodiment 6

In above-described Embodiment 5, pilot signal and transmit data transmission power values are reduced according to the number of communication terminal apparatuses with good communication quality on downlinks. However, as stated in Embodiment 4, reducing the transmit data transmission power value may lead to the generation of a large number of packets that are not received correctly by communication terminal apparatuses, and a fall in downlink total throughput, resulting in inefficient transmission.

Thus, in this embodiment, as in Embodiment 4, monitoring is carried out as to whether or not downlink total throughput can be maintained, and when downlink total throughput falls after the transmit data transmission power value is reduced, the transmit data transmission power value is made to approach the normal value.

Figure 17:
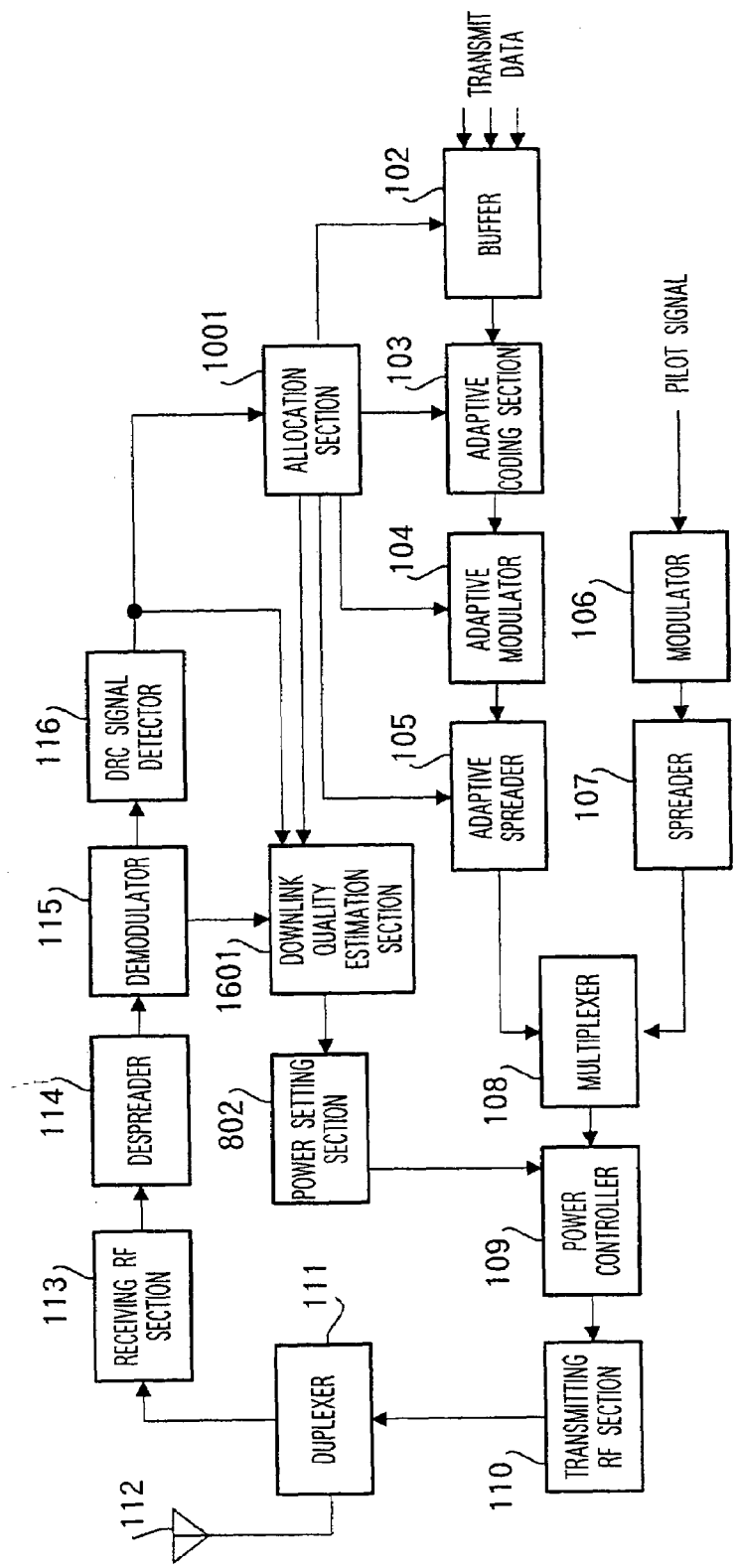
FIG. 17 is a block diagram showing the configuration of a base station apparatus according to Embodiment 6 of the present invention.

The configuration of a base station apparatus according to this embodiment will be described below with reference to FIG. 17. FIG. 17 is a block diagram showing the configuration of a base station apparatus according to Embodiment 6 of the present invention. Parts in FIG. 17 identical to those in FIG. 11 and FIG. 15 are assigned the same codes as in FIG. 11 and FIG. 15 and their detailed explanations are omitted.

Downlink quality estimation section 1601 in FIG. 17 has the same configuration as downlink quality estimation section 1401 in Embodiment 5, except for the following point. Namely, downlink quality estimation section 1601 monitors changes in overall downlink total throughput using allocation results from an allocation section 1001, generates information indicating transmission power based on the comparison results described in Embodiment 5 and these changes in total throughput, and outputs this information to a power setting section 802.

The configuration of a communication terminal apparatus according to this embodiment is the same as that in Embodiment 5 (FIG. 13), and a detailed explanation thereof is omitted here.

Figure 18:
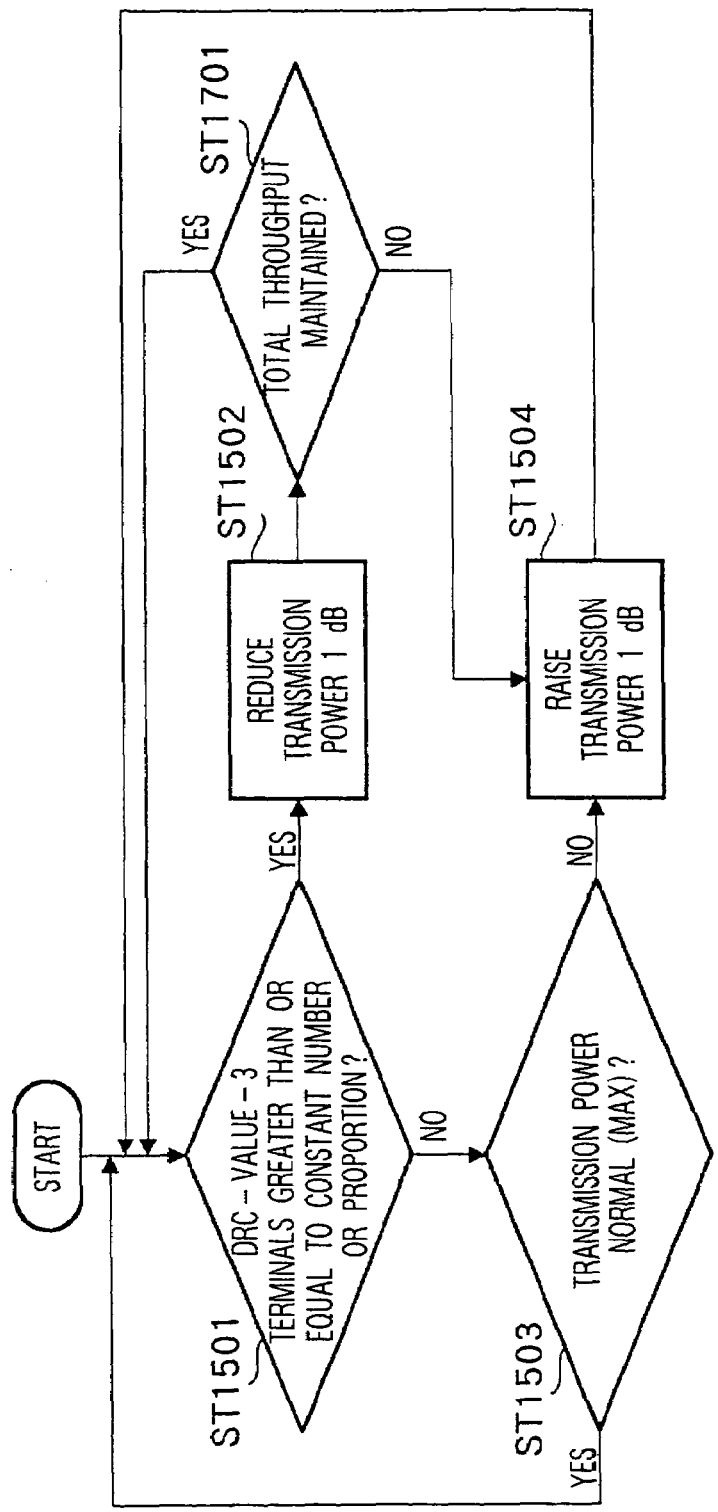
FIG. 18 is a flowchart showing the operation of a base station apparatus according to Embodiment 6 of the present invention.

Next, the operation of a base station apparatus with the above configuration will be further described with reference to FIG. 18. FIG. 18 is a flowchart showing the operation of a base station apparatus according to Embodiment 6 of the present invention. Detailed explanations of operations in FIG. 18 identical to operations in FIG. 16 are omitted.

After the transmission power value has been reduced by 1 [dB] in ST1502, as shown in ST1701 the downlink quality estimation section 1601 monitors downlink total throughput based on allocation results from the allocation section 1001, and determines whether or not total throughput has fallen compared to prior to the reduction in transmission power. When total throughput has not fallen, the processing flow proceeds to above-described ST1501. When total throughput has fallen, the processing flow proceeds to above-described ST1504.

In this embodiment, a case has been described where, when total throughput after a reduction in the transmission power value cannot be maintained at the total throughput prior to the reduction in the transmission power value, the transmission power value is gradually made to approach the normal value (the transmission power value is gradually raised), but the transmission power value may also be restored directly to its normal value.

Thus, according to this embodiment, a fall in downlink total throughput caused by reducing the transmission power value can be prevented by causing the pilot signal and transmit data transmission power value to approach the normal value in accordance with changes in downlink total throughput. By this means it is possible to achieve efficient transmit data transmission.

Embodiment 7

In this embodiment, a case is described where the distribution of DRC values reported by communication terminal apparatuses is used, as well as using just the number or proportion of communication terminal apparatuses reporting the highest DRC value, as an indicator for detecting whether or not downlink (data channel) quality is excessive.

Figure 19A:
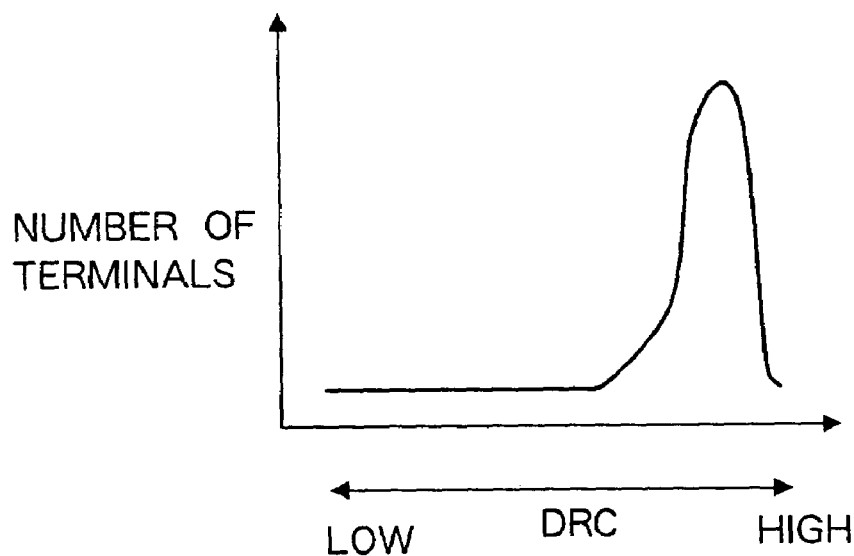
FIG. 19A is a diagram illustrating conceptually a first example of the distribution of DRC values reported by a communication terminal apparatus according to Embodiment 7 of the present invention.
Figure 19B:
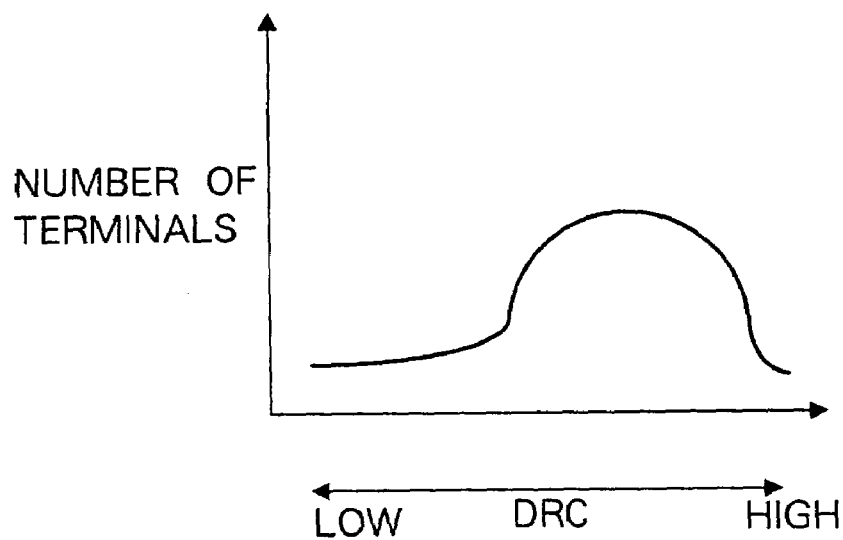
FIG. 19B is a diagram illustrating conceptually a second example of the distribution of DRC values reported by a communication terminal apparatus according to Embodiment 7 of the present invention.

FIG. 19A is a diagram illustrating conceptually a first example of the distribution of DRC values reported by a communication terminal apparatus according to Embodiment 7 of the present invention, and FIG. 19B is a diagram illustrating conceptually a second example of the distribution of DRC values reported by a communication terminal apparatus according to Embodiment 7 of the present invention. In FIG. 19A and FIG. 19B, the horizontal axis shows DRC values and the vertical axis shows the number of communication terminal apparatuses reporting those DRC values.

When the DRC value distribution is extremely biased toward the high end (the faster transmission rate end), as shown in FIG. 19A, it can be inferred that cell downlink quality is excessive. That is to say, the base station apparatus uses more than the necessary transmission power to perform transmission, and therefore major interference is caused to communication terminal apparatuses present in the cell of that base station apparatus and the cell of another base station apparatus.

In this case, reducing the pilot signal and transmit data transmission power results in the DRC value distribution not being extremely biased toward the high end (that is, in not having transmit data communications to communication terminal apparatuses with good communication quality predominate in downlinks), as shown in FIG. 19B. By this means, it is possible to suppress interference to communication terminal apparatuses present in the cell of that base station apparatus and the cell of another base station apparatus.

The configuration of a base station apparatus according to this embodiment will be described below. The configuration of a base station apparatus according to this embodiment is the same as that shown in FIG. 15, except that the downlink quality estimation section has the following configuration.

Namely, the downlink quality estimation section calculates the average value and dispersion of DRC values (in other words, pilot signal reception quality in each communication terminal apparatus) using DRC signals from a DRC signal detector 116, and determines the DRC value distribution state based on the results of these calculations. This downlink quality estimation section generates information indicating transmission power based on the result of determination of the distribution state, and outputs this information to a power setting section 802.

Figure 20:
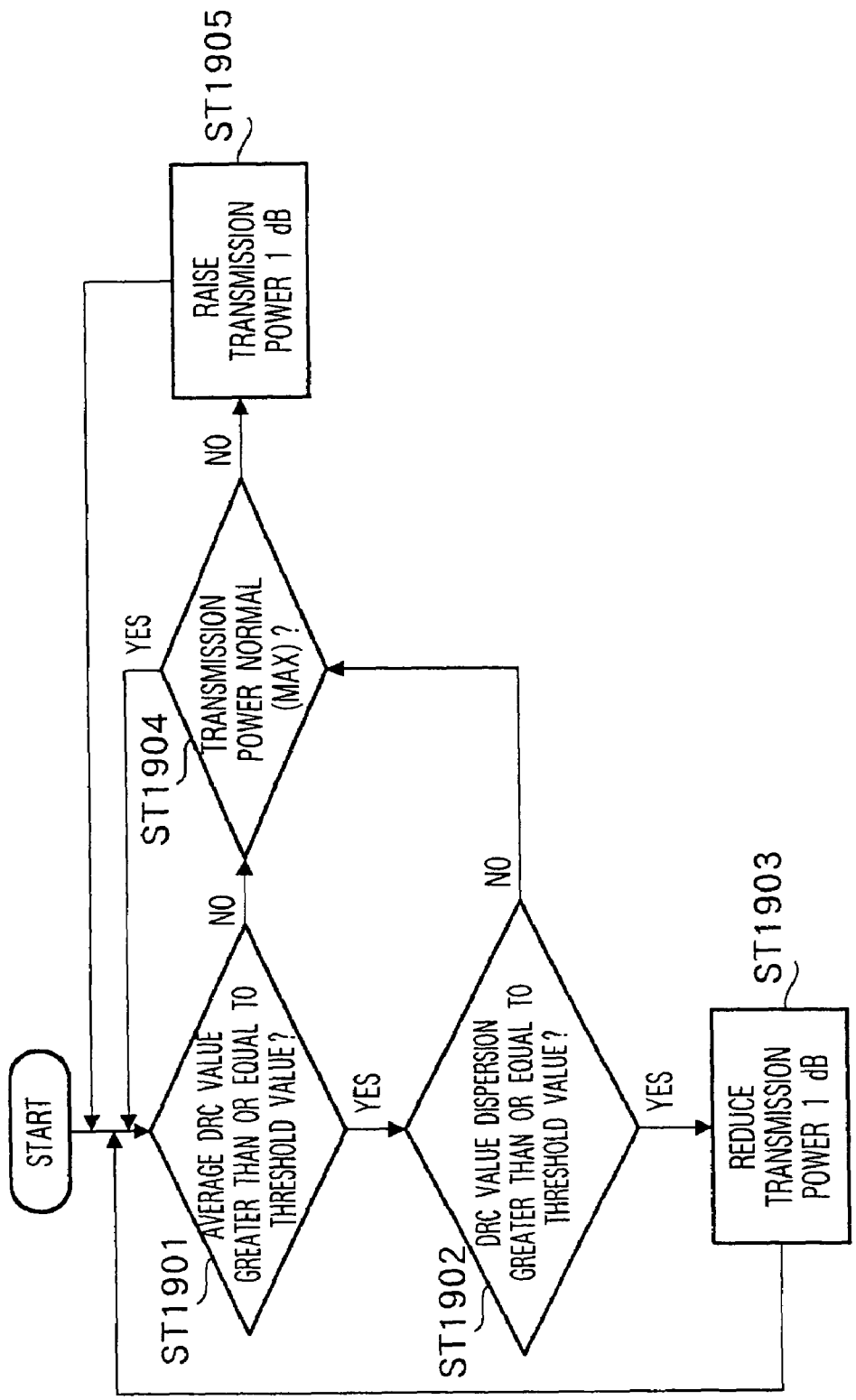
FIG. 20 is a flowchart showing the operation of a base station apparatus according to Embodiment 7 of the present invention.

Next, the operation of a base station apparatus according to this embodiment will be described with further reference to FIG. 20. FIG. 20 is a flowchart showing the operation of a base station apparatus according to Embodiment 7 of the present invention. Explanations of operations in this embodiment identical to operations in Embodiment 5 are omitted.

The downlink quality estimation section first calculates the average value and dispersion of DRC values reported by each communication terminal apparatus. In ST1901, it is determined whether the calculated average value is greater than or equal to a threshold value. When the calculated average value is greater than or equal to the threshold value, the processing flow proceeds to ST1902; when the calculated average value is less than the threshold value, the processing flow proceeds to ST1904.

In ST1902, it is determined whether the calculated DRC value dispersion is less than or equal to a threshold value. When the calculated dispersion is less than or equal to the threshold value, the processing flow proceeds to ST1903; when the calculated dispersion is greater than the threshold value, the processing flow proceeds to ST1904.

In ST1903, the DRC distribution is recognized as being extremely biased toward the high end from the fact that the calculated average value is greater than or equal to the threshold value and the calculated dispersion is less than or equal to the threshold value. Therefore, information is generated indicating that transmission power is to be reduced by, for example, 1 [dB].

In ST1904, on the other hand, when the calculated average value is less than the threshold value, or the calculated dispersion is greater than the threshold value, it is recognized that the DRC distribution is not extremely biased toward the high end. Furthermore, it is determined whether or not the transmission power value at the current point in time is the normal transmission power value (maximum value). When the transmission power value at the current point in time is the normal transmission power value, the processing flow proceeds to ST1901; when the transmission power value at the current point in time is less than the normal transmission power value, the processing flow proceeds to ST1905. In ST1905, information indicating that transmission power is to be raised by, for example, 1 [dB] is generated.

The information generated in ST1903 or ST1905 is output to the power setting section 802.

Thus, in this embodiment, by using the distribution of DRC values reported by communication terminal apparatuses, it is possible to detect reliably whether or not downlink quality is excessive—that is, whether or not transmit data communications to communication terminal apparatuses with good communication quality are predominant on downlinks.

Embodiment 8

In above-described Embodiment 7, the distribution state of DRC values is detected using the average value and dispersion of DRC values, and using the detected distribution state, transmission power is reduced by 1 [dB] when the DRC distribution is biased toward the high end, and transmission power is raised by just 1 [dB] so as to bring it closer to the normal transmission power value when the DRC distribution is not biased toward the high end.

However, even in a situation where the DRC distribution is biased toward the high end, there is a first case where the DRC distribution is biased toward higher DRC values and a second case where the DRC distribution is biased toward lower DRC values. The optimal transmission power value reduction amount differs according to whether the first case or the second case applies to the DRC distribution state. That is to say, considered from the standpoints of interference to communication terminal apparatuses in other cells and total throughput, it is desirable for the optimal reduction amount in the second case to be smaller that the optimal reduction amount in the first case.

Similarly, even in a situation where the DRC distribution is biased toward the low end, there is a third case where the DRC distribution is biased toward lower DRC values and a fourth case where the DRC distribution is biased toward higher DRC values. The optimal transmission power value reduction amount differs according to whether the third case or the fourth case applies to the DRC distribution state. That is to say, considered from the standpoints of interference to communication terminal apparatuses in other cells and total throughput, it is desirable for the optimal increase amount in the third case to be greater that the optimal increase amount in the fourth case.

Thus, in this embodiment, after DRC values for which extreme bias has occurred have been determined based on the DRC value distribution state detected using the average value and dispersion of DRC values, transmission power value control (that is, increase amount or reduction amount control) is performed according to the result of the determination.

The configuration of a base station apparatus according to this embodiment will be described below. The configuration of a base station apparatus according to this embodiment is the same as that shown in FIG. 15, except that the downlink quality estimation section has the following configuration.

Namely, the downlink quality estimation section calculates the average value and dispersion of DRC values (in other words, pilot signal reception quality in each communication terminal apparatus) using DRC signals from a DRC signal detector 116, and determines the DRC value distribution state (specifically, in what DRC values bias has occurred) based on the results of these calculations. This downlink quality estimation section generates information indicating transmission power based on the result of determination of the distribution state, and outputs this information to a power setting section 802.

Figure 21:
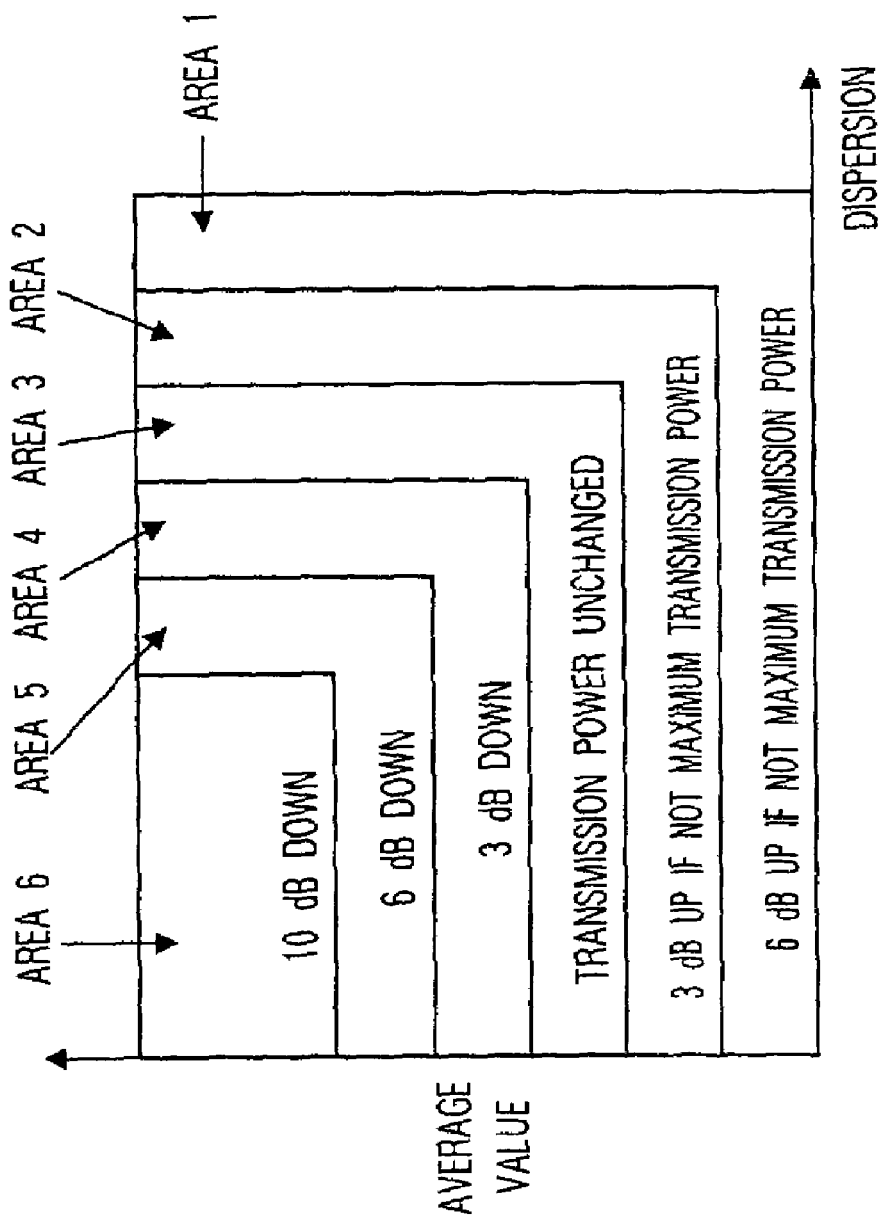
FIG. 21 is a diagram showing an example of the relationship between average DRC values, dispersion, and transmission power values in a base station apparatus according to Embodiment 8 of the present invention.
Figure 22:
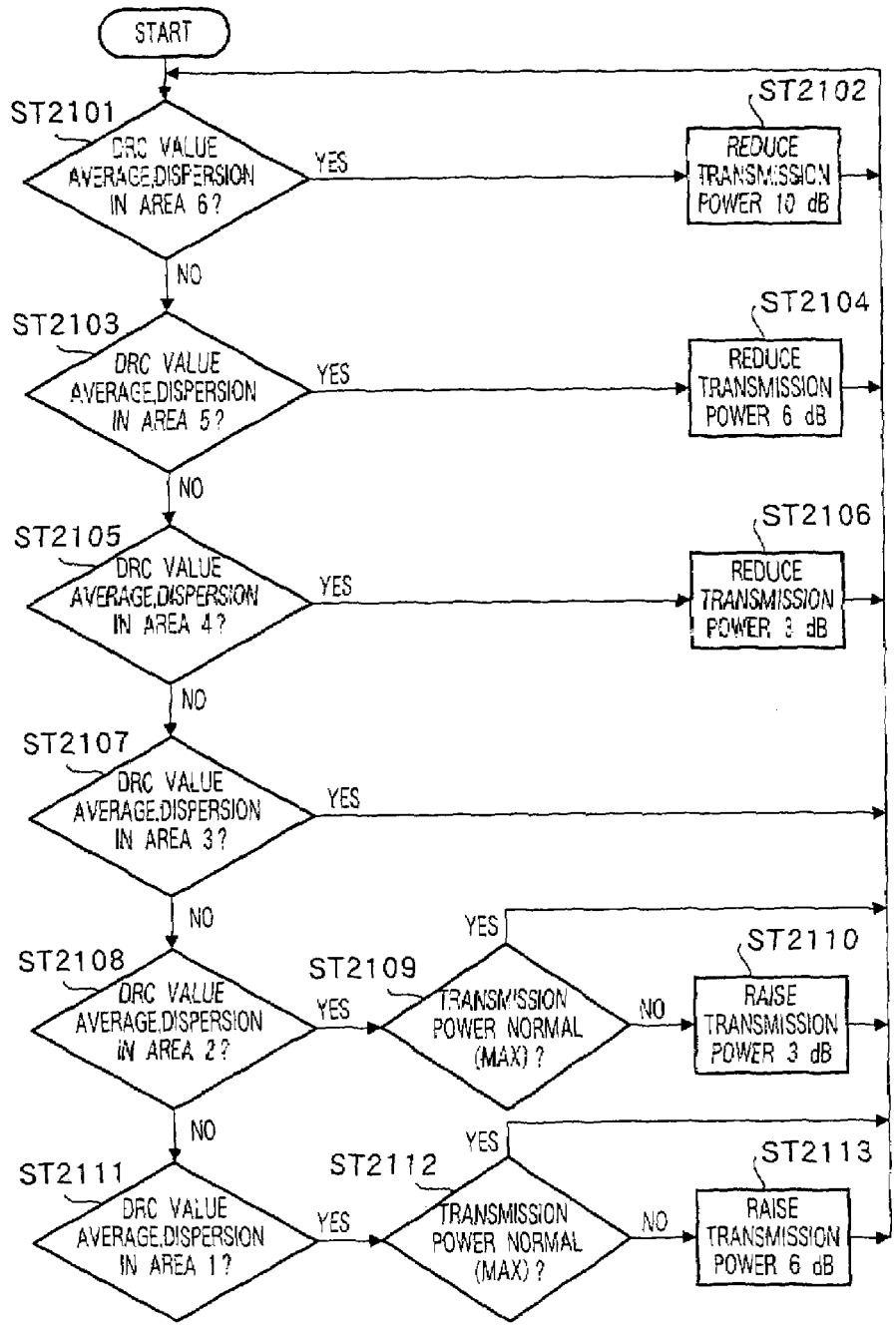
FIG. 22 is a flowchart showing the operation of a base station apparatus according to Embodiment 8 of the present invention.

Next, the operation of a base station apparatus according to this embodiment will be described with reference to FIG. 21 and FIG. 22. FIG. 21 is a diagram showing an example of the relationship between average DRC values, dispersion, and transmission power values in a base station apparatus according to Embodiment 8 of the present invention, and FIG. 22 is a flowchart showing the operation of a base station apparatus according to Embodiment 8 of the present invention. Detailed explanations of operations in this embodiment identical to operations in Embodiment 7 are omitted.

In the downlink quality estimation section, the average value and dispersion of DRC values reported by each communication terminal apparatus are first calculated. Also, information indicating transmission power is generated in accordance with the relationships shown in FIG. 21, using the calculated average value and dispersion.

Specifically, in ST2101, it is determined whether or not the average value and dispersion of DRC values are in area 6 shown in FIG. 21. When the average value and dispersion are in area 6 (that is, when bias has occurred in the highest DRC value), information indicating that transmission power is to be reduced by 10 [dB] is generated in ST2102, and then the processing flow returns to ST2101. If, on the other hand, the average value and dispersion are not in area 6, the processing flow proceeds to ST2103.

In ST2103, it is determined whether or not the average value and dispersion of DRC values are in area 5. When the average value and dispersion are in area 5 (that is, when bias has occurred in a lower DRC value than in the case of area 6), information indicating that transmission power is to be reduced by 6 [dB] is generated in ST2104, and then the processing flow returns to ST2101. When, on the other hand, the average value and dispersion are not in area 5, the processing flow proceeds to ST2105.

In ST2105, it is determined whether or not the average value and dispersion of DRC values are in area 4. When the average value and dispersion are in area 4 (that is, when bias has occurred in a lower DRC value than in the case of area 5), information indicating that transmission power is to be reduced by 3 [dB] is generated in ST2106, and then the processing flow proceeds to ST2101. When, on the other hand, the average value and dispersion are not in area 4, the processing flow proceeds to ST2107.

In ST2107, it is determined whether or not the average value and dispersion of DRC values are in area 3. When the average value and dispersion are in area 3 (that is, in the most desirable case in which bias has not occurred in any DRC value), the processing flow proceeds to ST2101 without information indicating that transmission power is to be increased or reduced being generated. When, on the other hand, the average value and dispersion are not in area 3, the processing flow proceeds to ST2108.

In ST2108, it is determined whether or not the average value and dispersion of DRC values are in area 2. When the average value and dispersion are in area 2 (that is, when bias has occurred in a low DRC value), it is determined in ST2109 whether or not the transmission power value at the current point in time is the normal transmission power value. When the transmission power value at the current point in time is the normal transmission power value, the processing flow returns to ST2101 without information indicating that transmission power is to be changed being generated. When the transmission power value at the current point in time is not the normal transmission power value, information indicating that transmission power is to be raised by 3 [dB] is generated in ST2110, and the processing flow returns to ST2101.

When, on the other hand, the average value and dispersion are not in area 2, the processing flow proceeds to ST2111.

In ST2111, it is determined whether or not the average value and dispersion of DRC values are in area 1. When the average value and dispersion are in area 1 (that is, when bias has occurred in a lower DRC value than in the case of area 2), it is determined in ST2112 whether or not the transmission power value at the current point in time is the normal transmission power value. When the transmission power value at the current point in time is the normal transmission power value, the processing flow returns to ST2101 without information indicating that transmission power is to be changed being generated. When the transmission power value at the current point in time is not the normal transmission power value, information indicating that transmission power is to be raised by 6 [dB] is generated in ST2113, and the processing flow proceeds to ST2101.

Thus, in this embodiment, by determining DRC values for which extreme bias has occurred using the average value and dispersion of DRC values, and then performing transmission power control based on the result of the determination, it is possible to reduce interference to communication terminal apparatuses in other cells and execute an improvement of total throughput at high speed and with high precision.

In a case where the control described in above Embodiment 1 through above Embodiment 8 is performed by all base station apparatuses, it is possible to reduce parts in which the areas of base station apparatuses overlap, and therefore, although throughput may fall at the instant at which transmission power is reduced, taking a long-term view overall system throughput can be maximized.

Also, it is possible for the base station apparatuses and communication terminal apparatuses described in above Embodiment 1 through above Embodiment 8 to be used in combination.

As is clear from the above descriptions, according to the present invention it is possible to provide a communication terminal apparatus that suppresses interference to a communication terminal apparatus that performs adaptive modulation communication with another base station apparatus and a communication terminal apparatus that performs adaptive modulation communication with the local base station apparatus at the same time.

This application is based on Japanese Patent Application No. 2000-232270 filed on Jun. 26, 2000, Japanese Patent Application No. 2000-204181 filed on Jul. 5, 2000, Japanese Patent Application No. 2000-220344 filed on Jul. 21, 2000, and Japanese Patent Application No. 2000-231256 filed on Jul. 31, 2000, entire content of which is expressly incorporated by reference herein.

INDUSTRIAL APPLICABILITY

The present invention is suitable for use in a cellular communication system.

The invention claimed is:

1. A communication terminal apparatus comprising:
a reception section that receives a signal transmitted from a base station apparatus; and
a transmission section that transmits an indicator indicating a modulation scheme and a power adjustment level in accordance with quality of the received signal, wherein:
the transmission section transmits (a) the indicator indicating a predetermined modulation scheme and a predetermined power adjustment level when the quality of the received signal is a predetermined value, (b) the indicator indicating a modulation scheme smaller than the predetermined modulation scheme and the predetermined power adjustment level when the quality of the received signal is smaller than the predetermined value, and (c) the indicator indicating the predetermined modulation scheme and a power adjustment level smaller than the predetermined power adjustment level when the quality of the received signal is larger than the predetermined value.

2. The communication terminal apparatus according to claim 1, wherein the transmission section transmits the indicator indicating a smaller modulation scheme as the quality of the received signal decreases.

3. The communication terminal apparatus according to claim 1, wherein the transmission section transmits the indicator indicating a smaller power adjustment level as the quality of the received signal increases.

4. A base station apparatus comprising:
a reception section that receives an indicator from a communication terminal apparatus; and
a control section that controls a modulation scheme and a power adjustment level of a signal to be transmitted to the communication terminal apparatus in accordance with the indicator, wherein:
the indicator indicates (a) a predetermined modulation scheme and a predetermined power adjustment level when quality of a previously transmitted signal is a predetermined value, (b) a modulation scheme smaller than the predetermined modulation scheme and the predetermined power adjustment level when the quality of the previously transmitted signal is smaller than the predetermined value, and (C) the predetermined modulation scheme and a power adjustment level smaller than the predetermined power adjustment level when the quality of the previously transmitted signal is larger than the predetermined value.

5. The base station apparatus according to claim 4, wherein the indicator indicates a smaller modulation scheme as the quality of the transmitted signal decreases.

6. The base station apparatus according to claim 4, wherein the indicator indicates a smaller power adjustment level as the quality of the transmitted signal increases.

7. A radio communication method comprising:
a reception step of receiving a signal transmitted from a base station apparatus; and
a transmission step of transmitting an indicator indicating a modulation scheme and a power adjustment level in accordance with quality of the received signal, wherein:
in the transmission step, (a) transmitting the indicator indicating a predetermined modulation scheme and a predetermined power adjustment level when the quality of the received signal is a predetermined value, (b) transmitting the indicator indicating a modulation scheme smaller than the predetermined modulation scheme and the predetermined power adjustment level when the quality of the received signal is smaller than the predetermined value, and (c) transmitting the indicator indicating the predetermined modulation scheme and a power adjustment level smaller than the predetermined power adjustment level when the quality of the received signal is larger than the predetermined value.

8. A radio communication method comprising:
a reception step of receiving an indicator from a communication terminal apparatus; and
a control step of controlling a modulation scheme and a power adjustment level of a signal to be transmitted to the communication terminal apparatus in accordance with the indicator, wherein:
the indicator indicates (a) a predetermined modulation scheme and a predetermined power adjustment level when quality of a previously transmitted signal is a predetermined value, (b) a modulation scheme smaller than the predetermined modulation scheme and the predetermined power adjustment level when the quality of the previously transmitted signal is smaller than the predetermined value, and (c) the predetermined modulation scheme and a power adjustment level smaller than the predetermined power adjustment level when the quality of the previously transmitted signal is larger than the predetermined value.

* * * * *

UNITED STATES PATENT AND TRADEMARK OFFICE
CERTIFICATE OF CORRECTION

PATENT NO. : 7,460,880 B2　　　　　　　　　　　　　　　　　　　　　　　　　　　　Page 1 of 1
APPLICATION NO. : 11/341430
DATED : December 2, 2008
INVENTOR(S) : Kenichi Miyoshi et al.

It is certified that error appears in the above-identified patent and that said Letters Patent is hereby corrected as shown below:

On the title page: Item (30) for the Foreign Application Priority Data is not included and should read:

(30)　Foreign Application Priority Data

Jun. 26, 2000　(JP)..................... 2000-232270
Jul. 5, 2000　(JP)..................... 2000-204181
Jul. 21, 2000　(JP)..................... 2000-220344
Jul. 31, 2000　(JP)..................... 2000-231256

Signed and Sealed this

Twenty-first Day of December, 2010

David J. Kappos
*Director of the United States Patent and Trademark Office*